Fig 6a

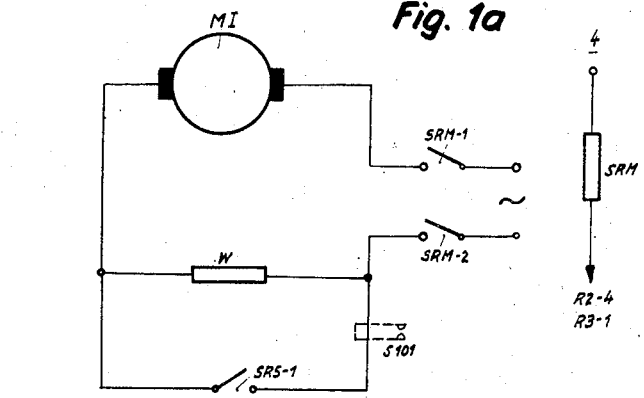
Fig. 1a
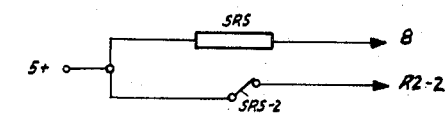
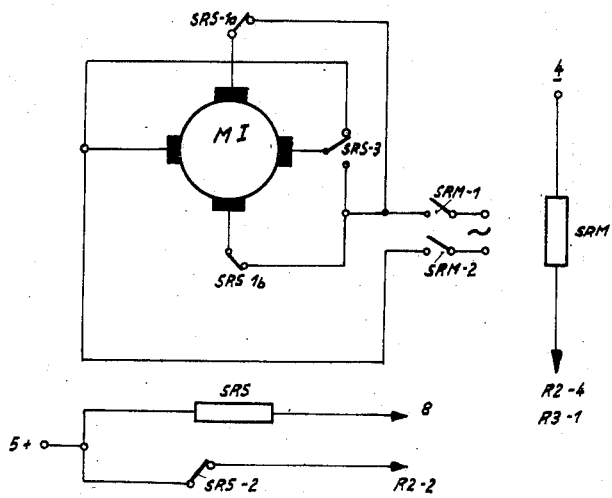
Fig. 1b

| Piece Work Slip N° | Prepared by/Date | Department | | Approved by | | Name of Worker | Invoice N° |
|---|---|---|---|---|---|---|---|
| Material List N° | Shop-N° | Job-N° | Truck-N° | Type-N° | Accounting Office N° | Order-N° | Serial-N° | Shop Section |
| 38⁻ | 34⁻ | 3408⁻ | 410280 | 10 | 510 | 324518⁻ | 52ª | 06⁻ |

| Description of Work | Quantity | Time per piece 1Piece | Total | Quantity | Supplement | Type and Dimensions | Quantity | Material and Replacement N° |
|---|---|---|---|---|---|---|---|---|
| | | | | | | | | |
| | | | | | | | | |
| | | | | | | | 112ª | |

Fig 6b

| Piece Work Slip N° | Prepared by/Date | Department | Approved by | Name of Worker | Invoice N° |
|---|---|---|---|---|---|
| Material List N° | Shop-N° | Job-N° | Truck-N° | Type-N° | Accounting Office N° | Order-N° | Serial-N° | Shop Section |
| 38⁻ | 34⁻ | 3408⁻ | 410280 | 10 | 788⁻ | 324518⁻ | 52ª | 06⁻ |

| Description of Work | Quantity | Time per piece 1Piece | Total | Quantity | Supplement | Type and Dimensions | Quantity | Material and Replacement N° |
|---|---|---|---|---|---|---|---|---|
| | | | | | | | | |
| | | | | | | 2ᴵ | | |

Fig 6c

| Piece Work Slip N° | Prepared by/Date | Department | Approved by | Name of Worker | Invoice N° |
|---|---|---|---|---|---|
| Material List N° | Shop-N° | Job-N° | Truck-N° | Type-N° | Accounting Office N° | Order-N° | Serial-N° | Shop Section |
| 38⁻ | 34⁻ | 3408⁻ | 410280 | 10 | 510 | 526301⁻ | 52ª | 06⁻ |

| Description of Work | Quantity | Time per piece 1Piece | Total | Quantity | Supplement | Type and Dimensions | Quantity | Material and Replacement N° |
|---|---|---|---|---|---|---|---|---|
| | | | | | | | | |
| | | | | | | 2ᴵᴵ | | |

Inventors
Herbert Rose
and
Erwin Spingies

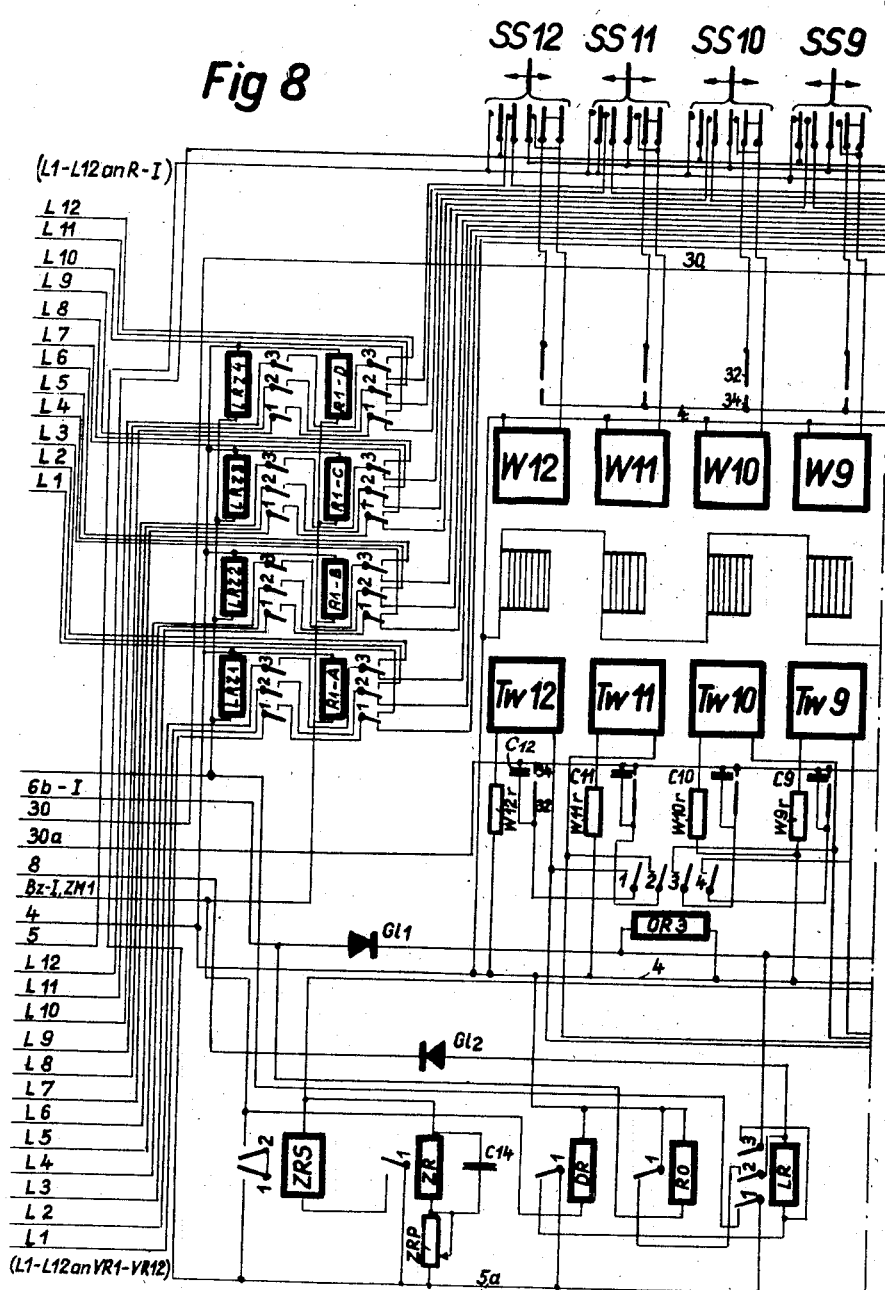

April 22, 1958     H. ROSE ET AL     2,831,633
APPARATUS FOR THE EVALUATION OF RECORDS REPRESENTING
DESCRIPTIVE AND NUMERICAL INFORMATION
Filed July 6, 1954     17 Sheets-Sheet 10

Inventors
Herbert Rose
and
Erwin Spingies

Inventors
Hubert Rose
and
Erwin Spingies

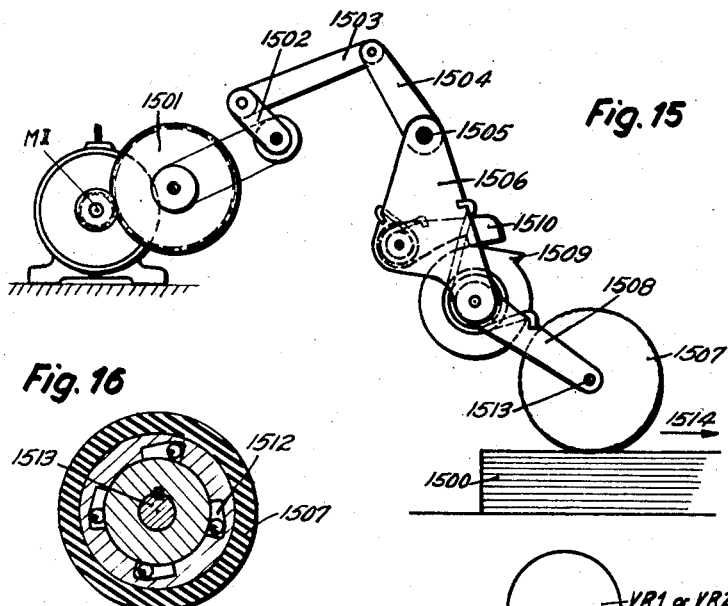
Fig. 15
Fig. 16
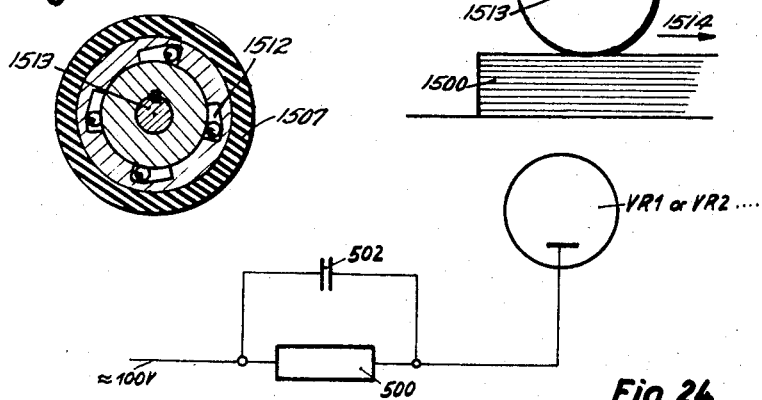
Fig. 24
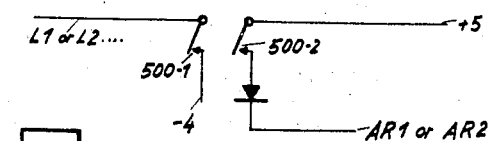
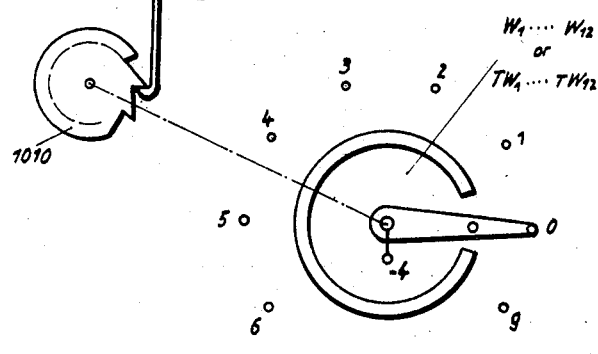
Fig. 25
Inventors
Hubert Rose
and
Erwin Hingies

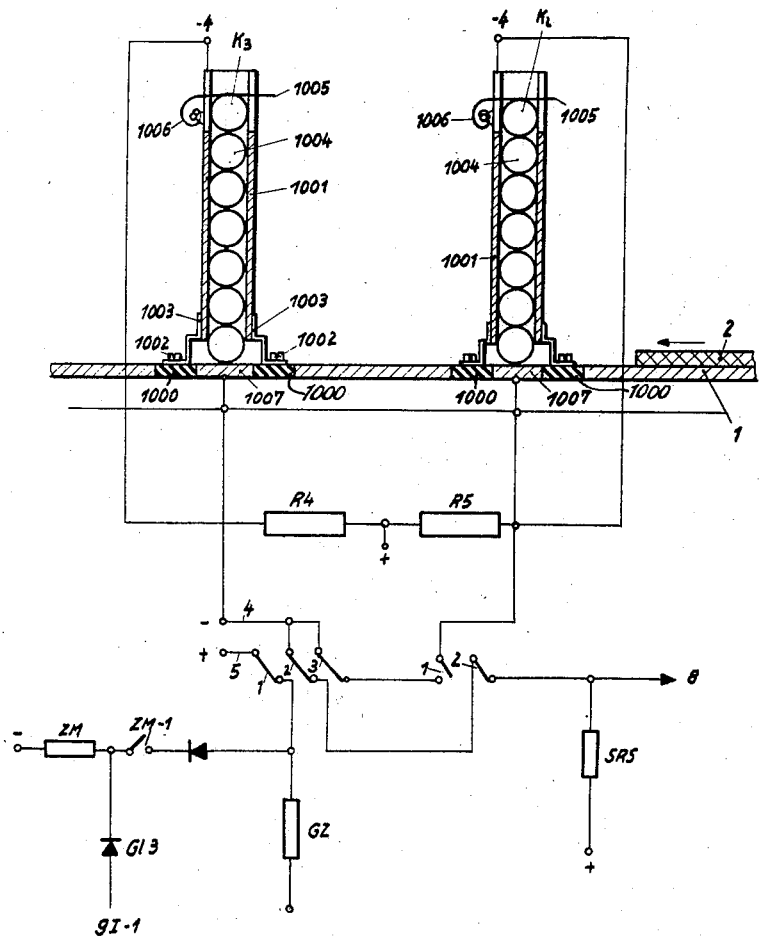

Inventors
Herbert Rose
and
Erwin Spingies

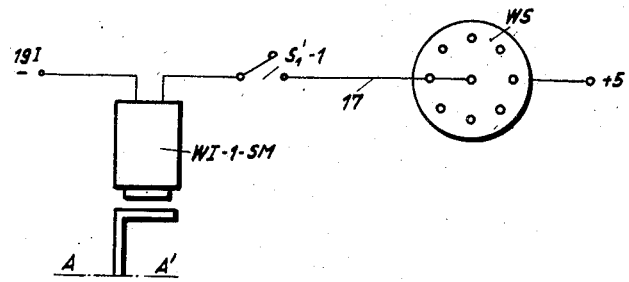
Fig. 20
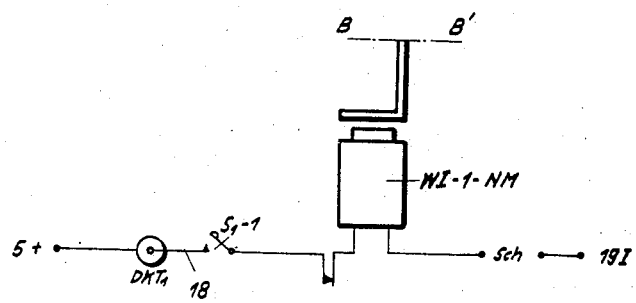
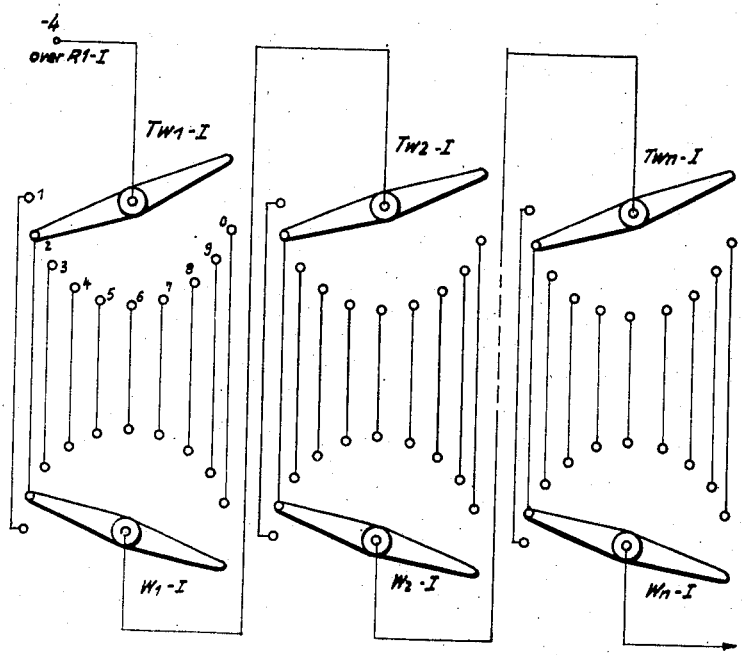
Fig. 21

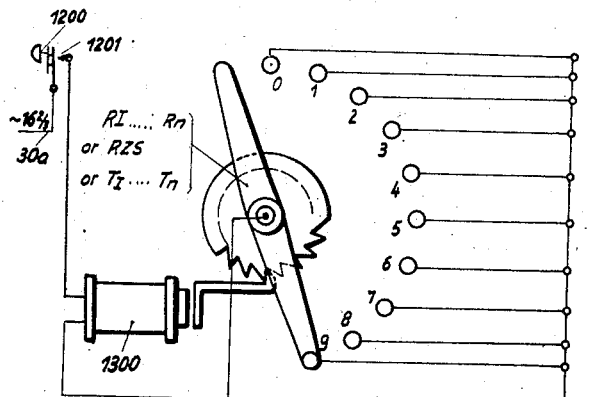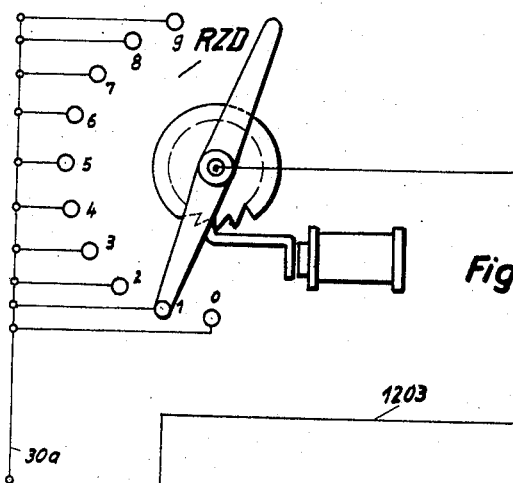
Fig. 26
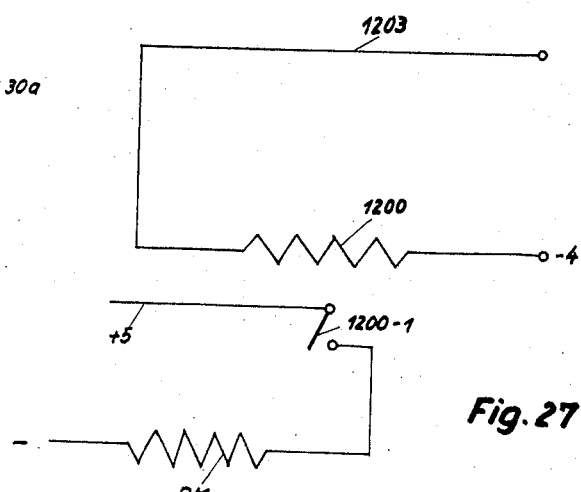
Fig. 27
Inventors
Herbert Rose
and
Erwin Spingier United States Patent Office 2,831,633
Patented Apr. 22, 1958

2,831,633
APPARATUS FOR THE EVALUATION OF RECORDS REPRESENTING DESCRIPTIVE AND NUMERICAL INFORMATION

Herbert Rose, Wohltorf, Lauenburg, and Erwin Spingies, Hamburg, Germany

Application July 6, 1954, Serial No. 441,598
Claims priority, application Germany July 11, 1953
36 Claims. (Cl. 235—61.6)

Our invention relates to methods and apparatus for the automatic evaluation of record forms or cards carrying group identifying, descriptive and other numerical information.

It is known to sort punched record cards according to different characteristics from a pile of such cards and to subsequently evaluate them arranged in groups. This mode of operation necessitates for each phase a separate machine and requires expensive equipment and intricate servicing.

It has also been suggested to manually feed a punched card, such as an account card, to a comparing device and to take the cards off the device in dependence upon the result of a comparing process after or without having taken an arithmetical value impressed upon the card, and to thereafter feed another punched card into the device for subsequent processing.

Machines of this type are not capable of handling an uninterrupted sequence of records, fed manually or mechanically, in a running flow so as to compare or evaluate the records simultaneously. Besides, these machines, for each fixed adjustment, can evaluate a sequence of records according to one characteristic only. The machines do not permit a simultaneous evaluation of unsorted or sorted records of different sizes, contained in a pile or stack, according to a variety of aspects.

It is an object of our invention to obviate these shortcomings and to provide a method and apparatus capable of processing a number of data-containing cards in a continuous sequence according to any desired number, within a predetermined maximum limit, of different preselectable characteristics.

To this end, and for achieving a variety of specific other objects apparent from the following, we supply records of uniform or different sizes, in any predetermined or random sequence and not pre-sorted as to their characteristics, to a feeding device which conveys the records, one after the other, to a sensing device with a given mutual spacing between adjacent ones of the records. In the sensing device the records are individually scanned and evaluated according to recorded information pertaining to a selected characteristic in such a way that from each of the consecutively arriving records all individual values that belong to the same characteristic or same column and are not totalling that characteristic or column are picked up by the sensing device in dependence on a pre-set control means and are then calculated in a calculating unit and compiled to a result by a printing and reproducing device following the calculating unit. The result totalling the columns is then reproduced in print or any other desired representation on the record from which the individual values are taken. Instead of, or simultaneously with the just-mentioned calculating and reproducing operation, and as may be desired, the sensed characteristic or a plurality of characteristics of the record are simultaneously entered into an optional number of comparing devices pre-set in accordance with different characteristics, and the compared record is automatically and discriminately deposited or filed in dependence upon the result of the comparing process occurring in the individual comparing devices. The comparing devices also operate in groups to automatically select a number of calculating devices assigned to the particular, positively compared characteristics of the comparing devices, and the selected calculating devices then operate to totalize or otherwise compute the result of the data values taken from the record or its columns by the sensing device. Thereafter, the evaluated record, when leaving the range of the sensing device, effects a resetting or clearing of all comparing devices.

According to one of the specific features of apparatus according to our invention, for performing the above-mentioned operation, it is provided with two different, consecutive and separately driven record-feeding means, one of which is capable of moving relative to the records to be fed, while the other always constrains the records to follow. Associated with these feeding means is a spacing unit for the records. For securing a constant spacing between the records despite possible variations in the sequence or size of the records, the spacing unit comprises a series of control means consecutive in the feeding direction. One of the control means controls the next preceding other control means in dependence upon the presence or absence of a record in such way that it will act in a retarding or releasing manner on the feeding of the subsequent record. The control means of the spacing unit are preferably of the photoelectric type to avoid the time delay or obstruction apt to occur with mechanically operative spacing devices.

According to another feature of the invention, an optional number of comparison units are connectable to the sensing unit, preferably by group-wise actuable switches such as Kellog switches, so that these comparison units simultaneously receive the particular characteristics of any record being sensed by the sensing unit. The switches, depending upon their selected position prepare the comparison-effecting parts of the comparison units either for comparing operation or cancellation and are additionally adjustable, as to each unit, to different characteristics for automatically selecting from a flow of consecutive records, those individual records that have the same and just as many differentiated characteristics. If a positive comparison result appears in one of the comparison units, the proper calculating unit is selected from a group of calculating units in dependence upon a control means associated with the comparison unit, the selecting operation taking place simultaneously with the switching-off of the comparison unit from the sensing unit, the selection of a sorting flap and of a record counter.

According to another feature of the invention, the records, whose characteristics are entered in the head portion of the record card or sheet, are provided with one or more entries that represent the arithmetical value or values totalling the columns of the record and are located in the foot portion of the record either within the appertaining columns or across a plurality of the columns; and the distance between the respective itemized and totalized representations of each record is traversed by accelerated travel of the record relative to the sensing unit. To this end, a control means is arranged in feeding direction behind the sensing unit and responsive to the arrival of a record sensed according to its characteristics. The control means is effective to initiate the rapid travel of the record to the position (foot portion) of its totalizing entries while preventing the transfer of any still remaining characteristics to be sensed. Another control means, arranged ahead of the sensing unit, operates to discontinue the rapid travel and to return the record feed to normal speed.

According to still another feature of the invention, the clearing of the comparison units at the sensing side is effected in two phases determined by the comparison result. For that purpose, the setting of the comparison units at the sensing side, when a negative result of comparison occurs, is canceled immediately after completion of the sensing operation. However, when a positive result is indicated in a comparison unit, the involved comparison units at the side of the sensing unit are cleared together with the preparation of the tens-transfer of the calculating units.

The objects and advantages of our invention, as well as the above-mentioned and other features of the invention set forth with particularity in the claims annexed hereto, will be apparent from, or will be mentioned in, the following description of the embodiment of apparatus according to the invention exemplified by the drawing.

Figs. 1a and 1b are respective modifications of a detail thereof.

Figs. 6a, 6b, and 6c exemplify a record suitable for evaluation by the means according to Figs. 1 to 5 and provided with respectively different entries.

Fig. 7 is explanatory and exemplifies a code combination for the representation of data on the record according to Figs. 6a to 6c.

Figure 9:
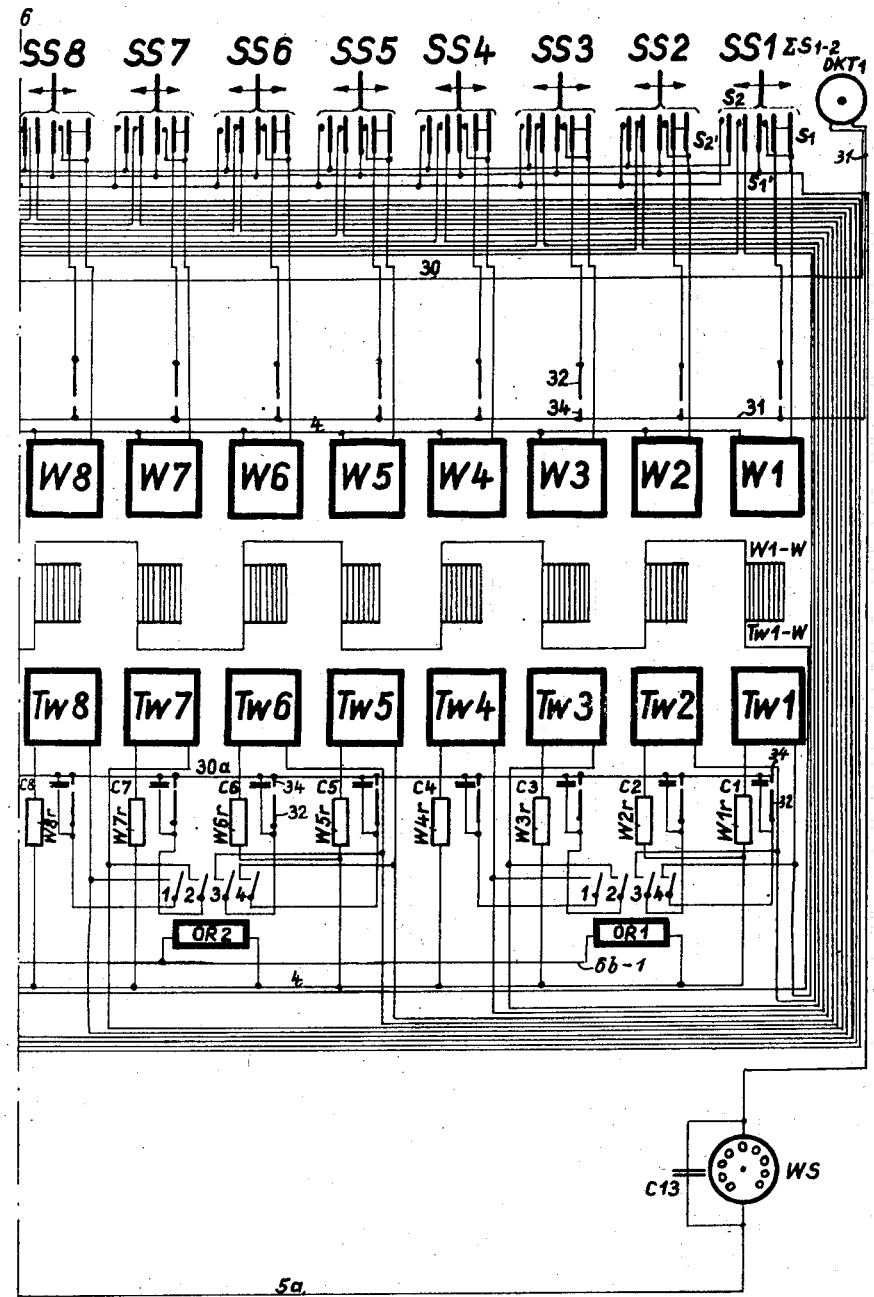

Figs. 8 and 9 show together a complete wiring diagram of a single comparing device.

Figures 10, 11:
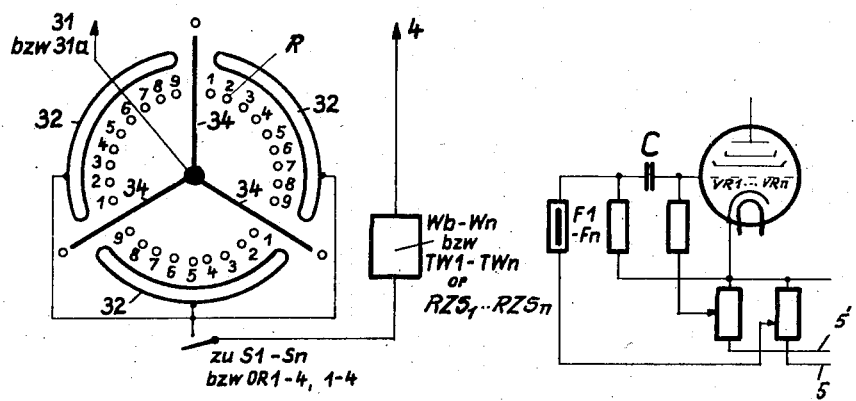

Fig. 10 shows a detail of the comparing device.

Fig. 11 shows a detail of the amplifying device pertaining to the sensing device.

Figure 12:
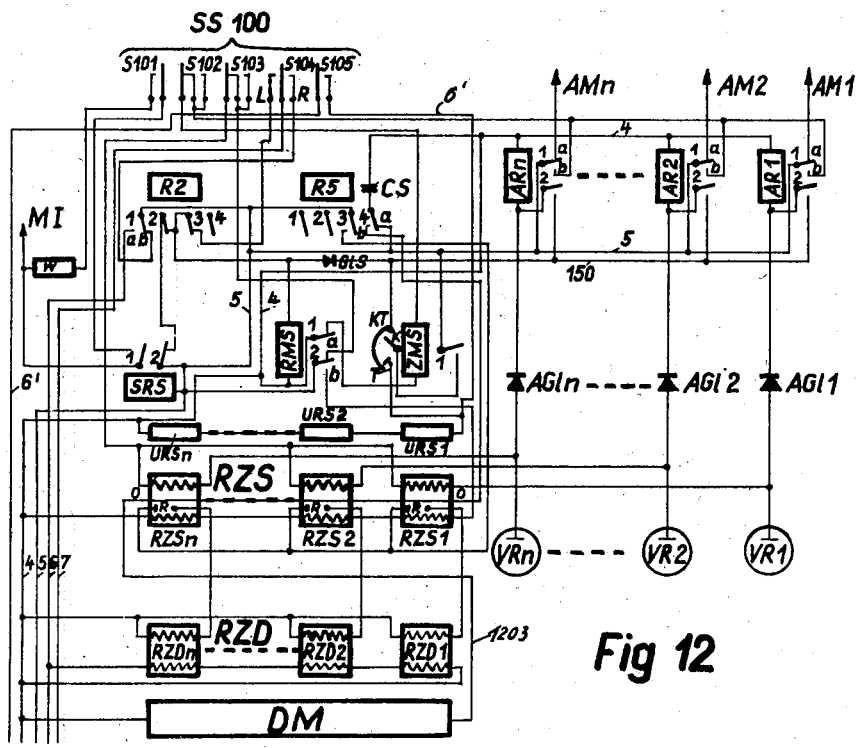
Figure 12A:
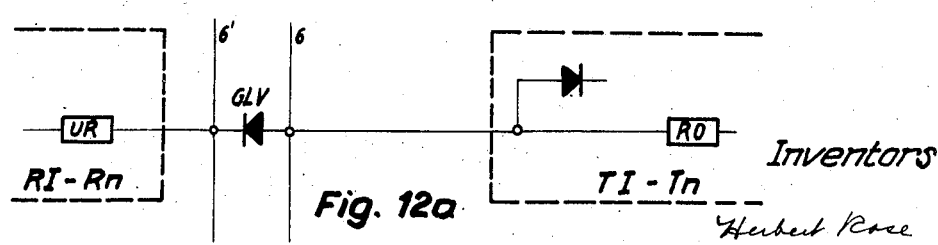

Fig. 12 is a wiring diagram for the intermediate totalizers of the machine, and Fig. 12a shows a detail of Fig. 12.

Figure 13:
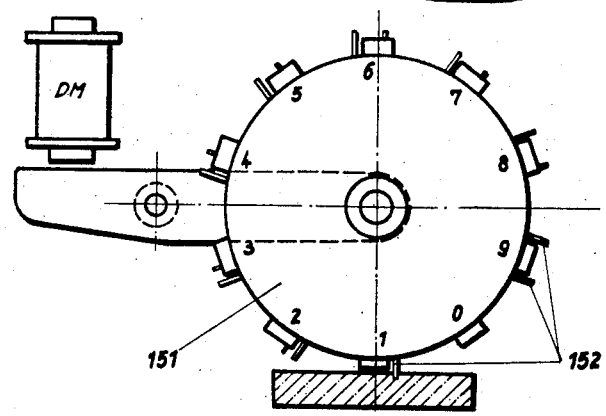

Fig. 13 shows a detail of the intermediate totals printing and punching device.

Figure 14:
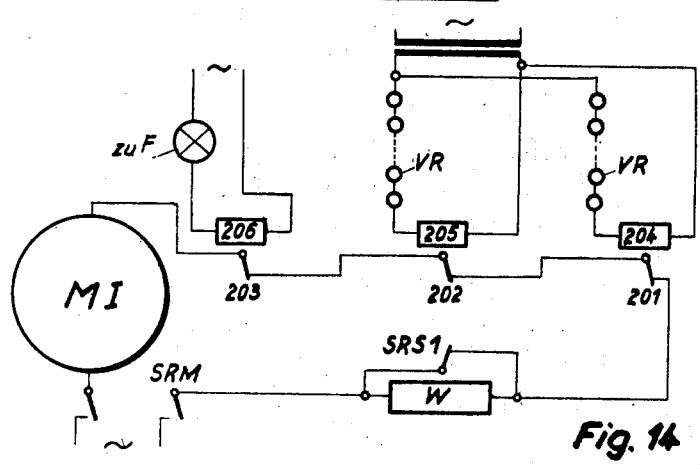

Fig. 14 is the circuit diagram of a detail pertaining to the wiring diagram according to Fig. 12.

Fig. 15 shows the device for lifting the records off a stack, and Fig. 16 illustrates in section a part of the same device.

Figure 1:
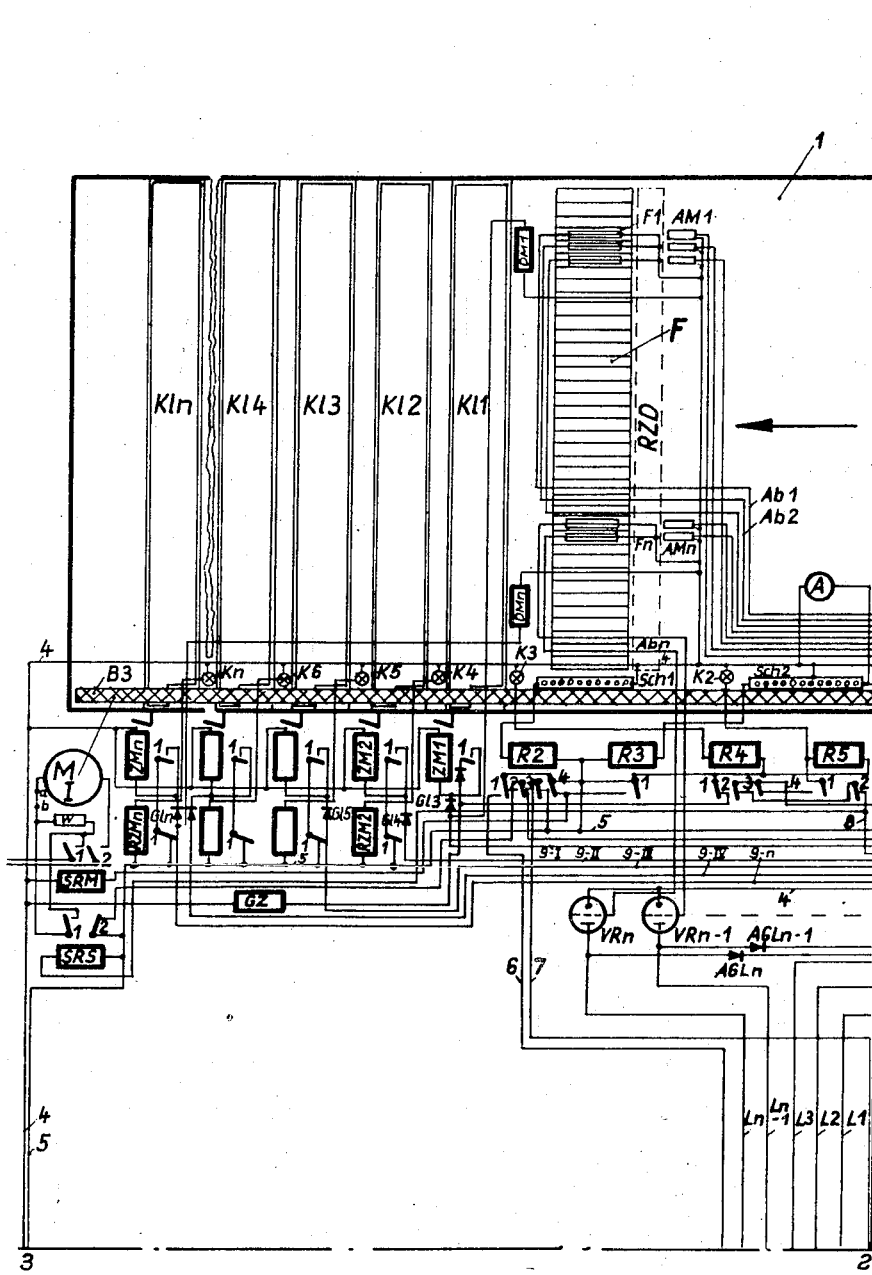
Fig. 1 shows diagrammatically the sensing and sorting device.
Figure 2:
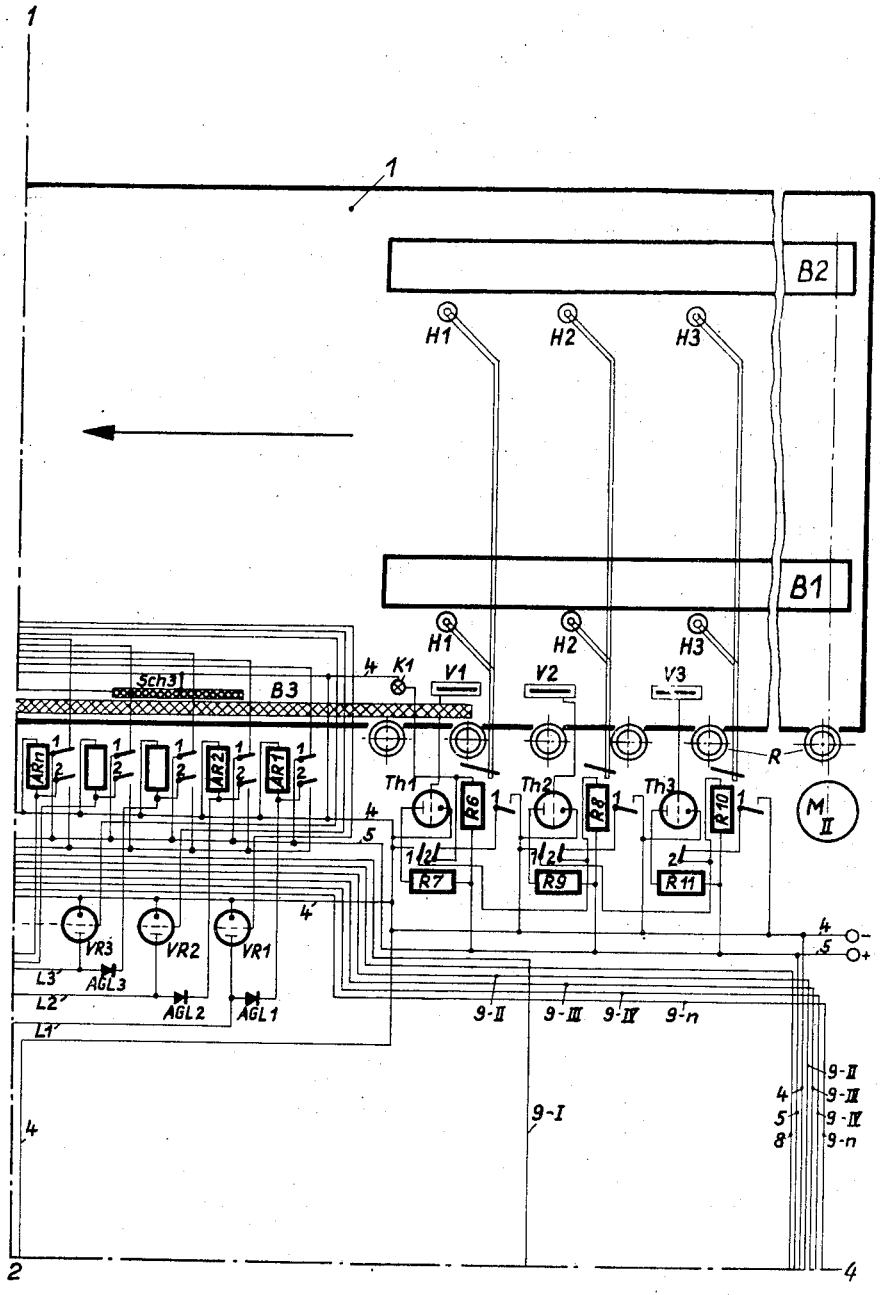
Fig. 2 is a diagram of the record feeding and amplifying device together with the switching means for controlling the sensing device.

Fig. 17 shows schematically a complete group of record actuated contact devices corresponding to Figs. 1 and 2.

Figure 18:
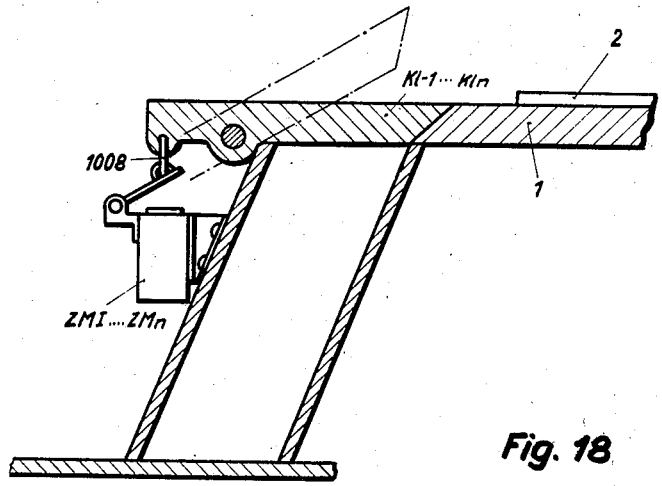

Fig. 18 is a sectional view of a sorting flap and receiving pocket for processed records.

Figure 19:
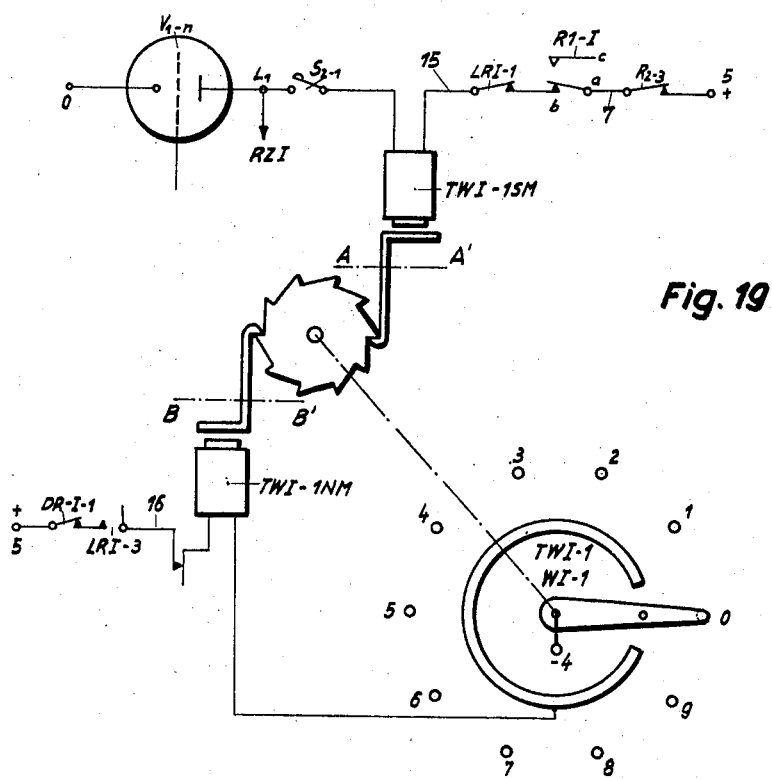

Fig. 19 shows schematically an embodiment of the sensing selector for the sensing devices with their switch-operating drives.

Fig. 20 shows schematically an embodiment of the setting selector for the sensing devices and switch drives in conjunction with Fig. 19.

Fig. 21 is a wiring diagram of the position-equal and other selector pairs of the sensing devices.

Figure 22:
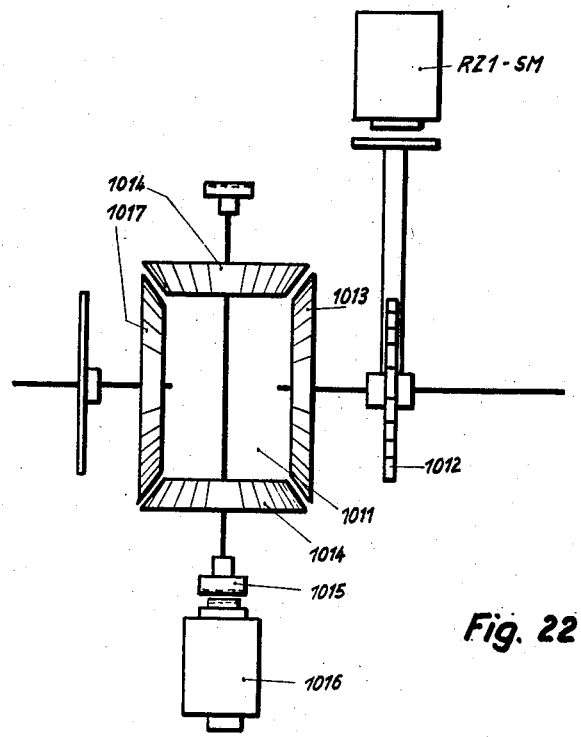

Fig. 22 shows a gearing arrangement illustrating the adding and subtracting connection of the calculating devices.

Figure 23:
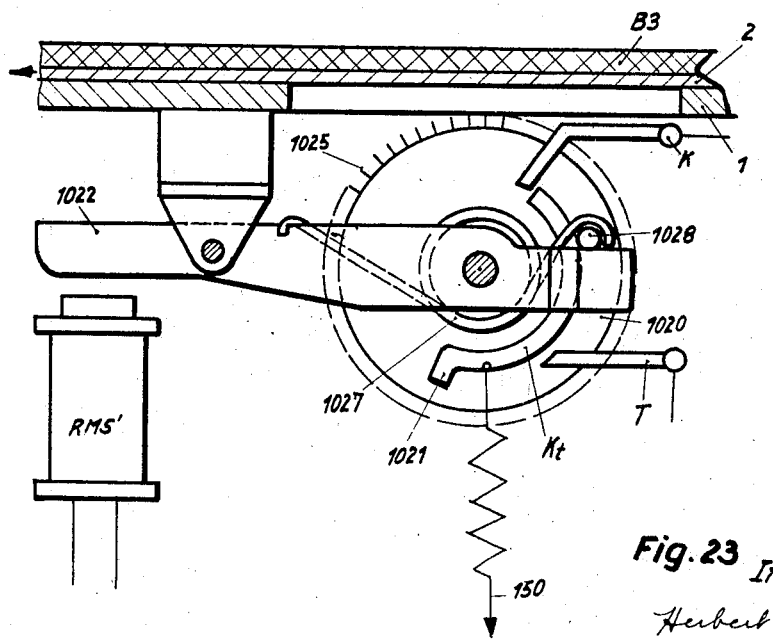

Fig. 23 illustrates a detail of the intermediate totalizer device.

Fig. 24 is a circuit diagram of a detail pertaining to the amplifier for sensed data according to Figs. 1 and 2.

Fig. 25 shows a detail of the drive for the calculating devices.

Fig. 26 shows the transferring means from the intermediate totalizer device to the printing device for one position.

Fig. 27 is a diagram of the control circuit for the printing magnet.

The same reference characters are used in the various illustrations for denoting the same components respectively.

Figure 3:
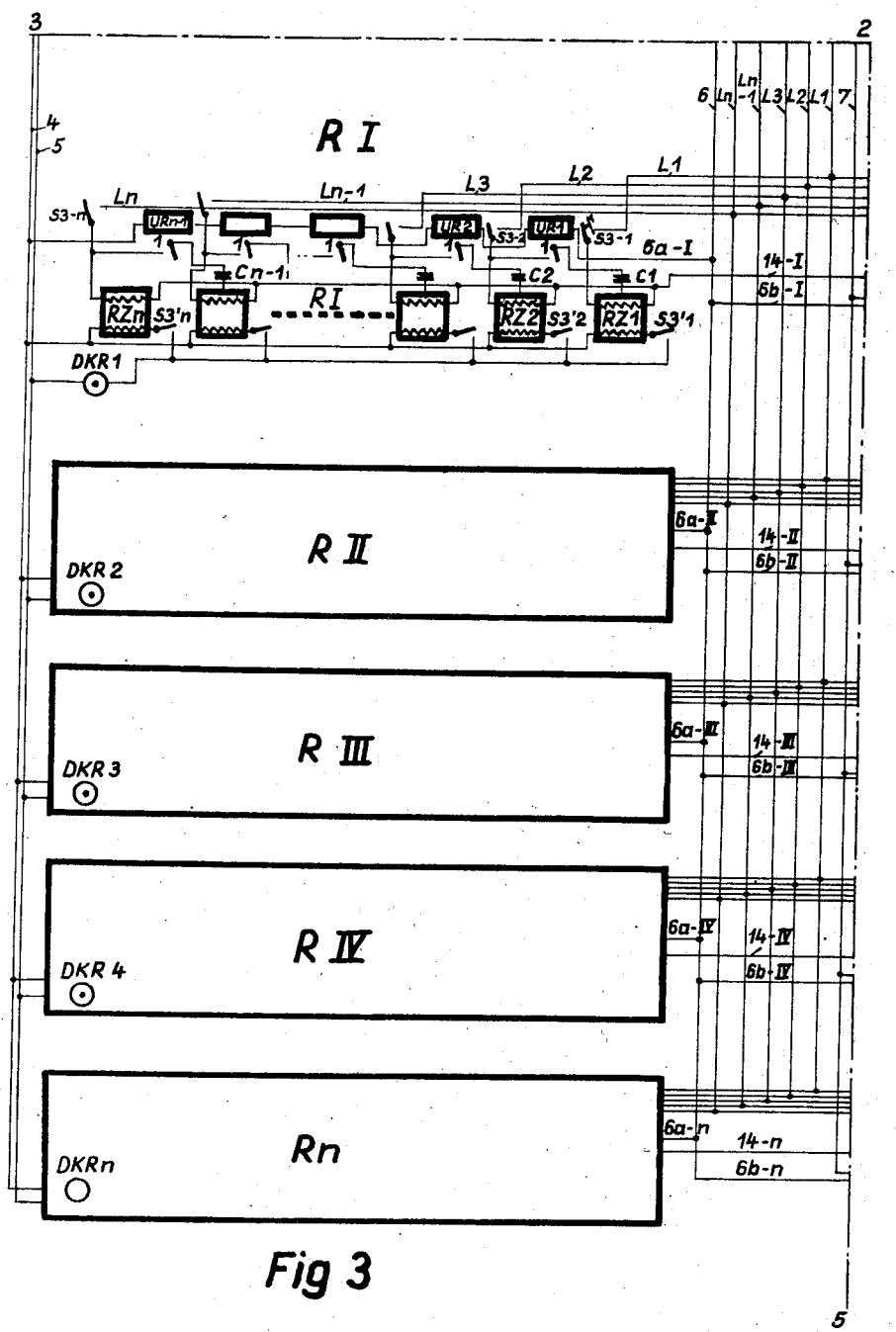
Fig. 3 is a diagram of the calculating device of the machine.
Figure 4:
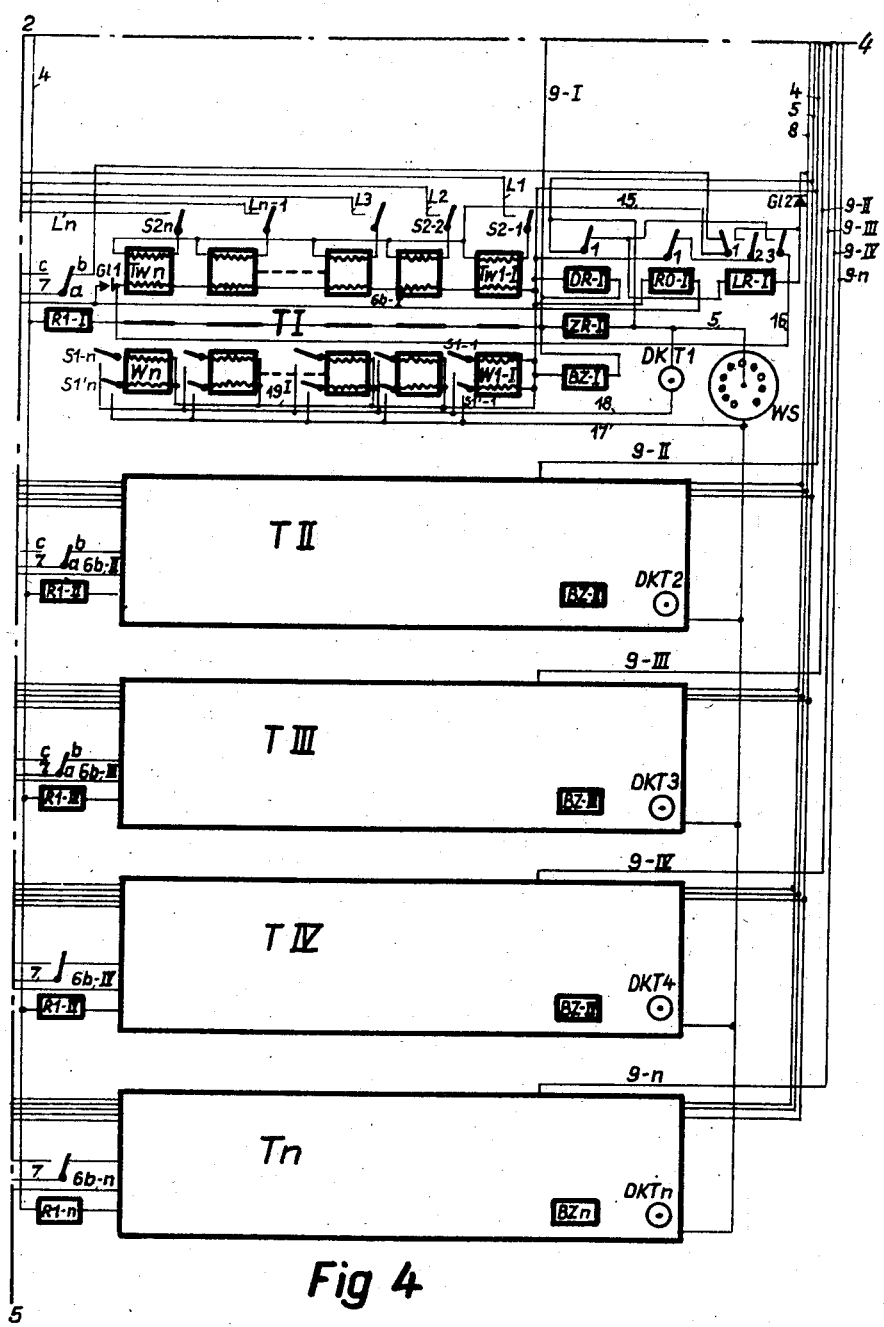
Fig. 4 is a diagram of the setting and comparing device of the machine.

Figs. 1 and 2 should be placed together along the respective vertical lines 1—2, Figs. 1 and 3 are to be joined along the respective horizontal lines 3—2, and Fig. 4 is to be joined with Figs. 2 and 3 along the lines 2—4 and 2—5 so that the four sheets form together a single diagram.

Figs. 8 and 9 are to be joined to form a single diagram by placing these figures together along the respective vertical lines 6—7.

A record carrier 1 (Figs. 1, 2, 2b, 5, 17, 18, 23) is fixed to the frame of the machine in an inclined position, e. g. at an angle 45°, sloping downwardly and toward the viewer as seen in Figs. 1 and 2. The upper parts of two endless feeding belts B1, B2 (Fig. 2) extend through longitudinal recesses of the record carrier 1 and project from below slightly beyond the top surface of the record carrier. The lower portion of the record carrier 1 is bent upwardly at an angle of 90°. Feeding rollers R have a part of their circumference pass through recesses of this angled-off portion so as to extend over an adjoining marginal zone of the record carrier for engagement with the edges of the records. All feeding rollers R are continuously driven by a constant speed motor MII together with the feeding belts B1, B2. The motor MII is connected to a current-supply line and can be switched on or off manually. The feeding belts B1, B2 and the feeding rollers R serve to convey the records placed on the record carrier by hand or fed mechanically. If the initial feeding of the record cards or forms 2 from the record stack 1500 (Fig. 15) is to be effected mechanically, this can be done with the means according to Figs. 15 and 16. The above-mentioned motor MII drives a crank 1502 through a reduction gear 1501 and a chain or belt. Crank 1502 revolves about a fixed pivot axis. A link 1503 connects crank 1502 with an arm 1504 firmly mounted on a drive shaft 1505 thus rocking the shaft 1505 in an oscillatory manner. Two axially spaced legs 1506 of a record grabbing device are fixed on the rocking drive shaft 1505 and carry two arms 1508 between which a grab roll 1507 is mounted. One of the arms 1508 is extended to form a latch 1509 to be engaged by a pawl 1510 when the grab roll 1507 is not in use and is to be kept away from the records 2 of the stack 1500. Pawl 1510 is mounted on the same arm 1508.

The pawl 1510 is biased by a torsional spring 1511 in the direction toward the latch 1509 so that the pawl normally rests on the back of the latch in non-locked position. The grab roll 1507 (Figs. 15, 16) is supported on a pin 1513 of the arms 1508 by means of a free-wheeling clutch 1512 in such a way that a record is taken along by the grab roll 1507 in the direction of arrow 1514 when the grab roll 1507 is blocked relative to the arms 1508, whereas the grab roll, during the return travel, rolls freely over the top of the record stack 1500 without any feeding action.

The last two feeding rollers R (Fig. 2) in the machine are positioned within the range of a further rotating feeding belt B3 (Figs. 1, 2). Belt B3 is arranged above the record carrier 1 in such a way that the record 2 passed on by the rollers R and the feeding belts B1, B2 passes between belt B3 and record carrier 1. The feeding belt B3 is driven by a motor MI (Fig. 1) capable of running at two different speeds, namely normal speed and higher speed, in dependence on the operating condition of the machine. The control means necessary for this operation are described in a later place.

Photo-resistors V1 to V3 (Fig. 2) are arranged above the record carrier 1 in the passing direction of the record 2 and at a distance from each other corresponding to the sum of the form length of the records plus the mutual spacing between adjacent ones of the records. The photo-resistors are displaceable to permit setting them to any form size of the records. The innermost photo-resistor V1 is fixed to the machine frame near the delivery end of the feeding belts B1 and B2. The photo-resistors V1 to V3 are connected to the respective ignition electrodes of thyratrons Th1 to Th3. The connection is only schematically indicated in Fig. 2 but will be more fully described below with reference to Fig. 2a. The cathode of each thyratron is connected to the negative bus 4 of a current supply line, while the anode is individually connected to a relay R7, R9 or R11 (Fig. 2). The relays R7, R9 and R11 are connected to the positive bus 5 of the line. Each of the relays R7 and R9 controls a contact pair R7–1 and R7–2, R9–1 and R9–2. Relay R11 has a contact R11–2. The contacts R7–2, R9–2 and R11–2 are closed when the relay is de-energized. The contacts R7–2, R9–2 and R11–2 individually control three further relays R6, R8 and R10 with respective holding contacts R6–1, R8–1 and R10–1. Relay R6 is furthermore connected in the circuit: positive bus 5, relay R6, contact K1, negative bus 4. Relay 8 is connected in a circuit that includes the contact R7–1. The relay R10 is similarly connected in a circuit that includes also the contact R9–1. Each relay R6, R8 and R10 is capable of turning a stop H1 to H3 out of the track of the records 2 when in excited condition (Figs. 2, 2b). The stops H1 to H3 are supported below the record carrier 1 transversely to the passing direction of the records 2 and are capable of projecting through recesses of the carrier as shown in Fig. 2b for the stop H1 of relay R6. The contact K1 is arranged above the record carrier 1 and conducts only when no record 2 is positioned between contact K1 and the part of the record carrier 1 beneath that contact.

Figure 2A:
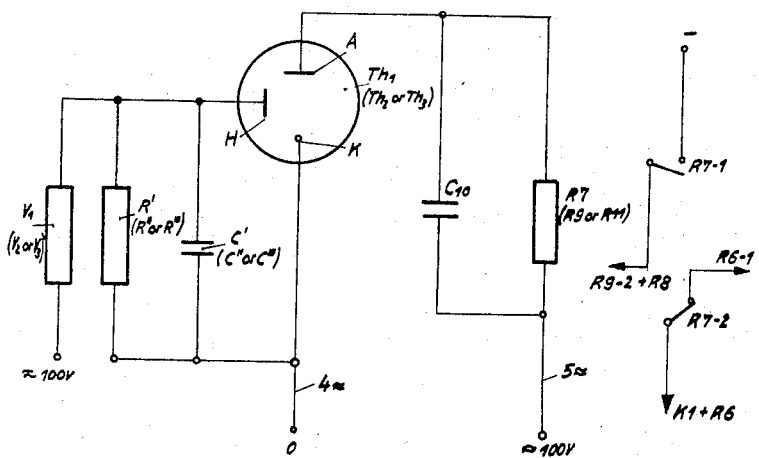
Figs. 2a and 2b illustrate details of the apparatus portion shown in Fig. 2.
Figure 2B:
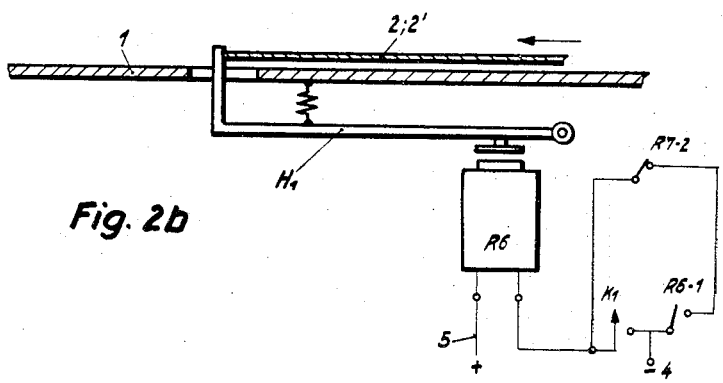

The circuit connection of one of the thyratrons of the group Th1 to Th3 is shown in Fig. 2a. The relay R7 (R9 or R11) is connected to the anode A of the thyratran Th1 (Th2 or Th3) in parallel relation to a smoothing capacitor C10. The plate circuit of the anode is connected to an alternating voltage line (buses 4, 5), for instance, of 100 volts. The cathode K is connected to the neutral-phase bus 4 of the line. Also connected to the neutral phase 4 are the return leads of parallel-arranged members represented by a resistor R' (R" or R''') connected with the photo-resistor circuit V1 (V2 or V3), and an impulse limiting capacitor C' (C" or C'''). The feeding lead of the photo resistor V1 (V2 or V3) is connected with the feeding lead of the resistor R' (R" or R''') and with the auxiliary anode H (ignition electrode) together with the feeding lead of the impulse limiting capacitor C' (C" or C'''). This applies to the case of a cold-cathode thyratron. If the thyratron is equipped with a heated cathode, the auxiliary anode is replaced by a grid that is connected as shown in Fig. 2a for the auxiliary anode H. The feeding lead of the photo-resistor V1 (V2 or V3) may be connected to a direct voltage or alternating voltage supply (e. g. 100 volts).

When the photo-resistor V1 (V2 or V3) is not exposed to a beam of light, the voltage in the photo-resistor circuit V1 (V2 or V3), R' (R" or R''') is applied to the greater part across the photo-resistor. Upon incidence of light on the photo-resistor, the ohmic value of the photo-resistor drops and approaches the order of magnitude of the resistor R' (R" or R'''). The voltage drop is then divided in proportion to the two resistances represented by V1 (V2 or V3) and R' (R" or R'''). The potential of the auxiliary anode or grid of the thyratron, relative to the cathode, is thereby changed and initiates the ignition of the thyratron Th1 (Th2 or Th3). The relay R7 (R9 or R11) will then respond and operate its respective contacts (Fig. 2).

Slide contacts Sch3, Sch2, Sch1 (Figs. 1, 2) are arranged behind the contact K1 in the travel direction of the records. Each of the slide contacts consists of a row of columns of small balls. The columns are independently movable in relation to each other and are each arranged in a sheet metal casing, for instance, as shown in Fig. 17 for the column of contacts K2 and K3 and described in a later place. The ball columns follow each other in the travel direction of the records and are each capable of closing the circuit when the record 2 (Figs. 6a to 6c) has passed between the column and the record carrier 1. the slide contacts Sch3, Sch2 and Sch1 (Figs. 1, 2) generally have a definite distance from each other as determined by the sequence of the records 2. The slide contacts Sch2 and Sch3 are displaceable toward and away from each other and relative to the slide contact Sch1 to permit setting them in accordance with possible changes in size of the records used and in order to compensate for irregularities in the feeding and/or position of the records 2. The slide contacts Sch2 and Sch3 are conductively connected to each other and to the negative bus 4. A relay R2 and the slide contact Sch1, and a relay R3 and the slide contacts Sch2, Sch3 are connected to the buses 4, 5 in parallel connection to each other. The relay R2 controls the contacts R2–1 to R2–4. Relay R3 controls only one contact R3–1. The contacts R2–1, R3–1 are open when the relay is not excited. The contact R3–1 is connected alternately with the contact R2–4 in a circuit comprising the components 5, R3–1, relay SRM, 4. Relay SRM, when excited, energizes the above-mentioned motor MI, through contacts SRM–1 and SRM–2. The circuit element W (Fig. 1) shown connected between the contact SRM–1 and the motor MI generally denotes a means for controlling of the speed of the motor MI (Figs. 1, 1a, or 1b). For instance, the element W may be a resistor, and the change in speed of the motor MI can be effected by shorting the resistor W by means of the contact SRS–1 of a relay SRS (Fig. 1a). If the motor MI is of the four-pole type, the change in speed may be effected by disconnecting one pole pair thus increasing the speed to twice the normal value. The disconnection may be controlled by means of a relay SRS (Fig. 1b) equipped with three contacts (SRS–1a, SRS–1b, SRS–3).

The contacts R2–1 and R2–3 (Fig. 1) are connected by leads 6 and 7 to the calculating and comparing devices R and T (Figs. 3 and 4) still to be described. The contact R2–2 (Fig. 1) is connected to a normally closed contact SRS–2 of the relay SRS for changing over to high speed of the motor MI. The relay SRS, when energized, opens the contact SRS–2 and simultaneously closes a second contact SRS–1 thus controlling the means (Fig. 1) for controlling the speed of the motor MI.

A number of relays AR1, AR2 . . . ARn have respective control contacts AR1–1, AR2–1 . . . ARn–1 and holding contacts AR1–2, AR2–2 . . . ARn–2. The control contacts AR1–1, AR2–1 . . . ARn–1 are connected with respective electromagnets AM1, AM2 . . . AMn (Figs. 1, 5) for sliding the shutters of a number of photoresistors F1, F2 . . . Fn. Each photo-resistor F1, F2 . . . Fn (Figs. 1, 5) is inserted in a casing portion 20 of the sensing device F which is closed toward the record 2 by a grid 21. The grid 21 has holes 21–1, 21–2 . . . 21–9. A second grid 22 is disposed in front of grid 21 in the direction of the incidence of light. Grid 22 is movable in the longtiudinal direction (arrow 22–0) of grid 22 under control by the electromagnet AM1, AM2 . . . AMn. The holes 22–1, 22–2 . . . 22–9 of grid 22 are in the illustrated position only when the electromagnet is excited.

The record carrier 1 has for each light beam and hence for each photo-resistor a row of holes 1–1, 1–2 . . . 1–9 or, instead of these holes, a continuous light-guiding slot in order to prevent reflections and lateral incidence of parasitic light. A light source, for instance a fluorescent lamp Li, is arranged below the record carrier 1 and its light-guiding slot or holes 1–1, 1–2 . . . 1–9. The lamp Li is connected in a separate circuit (see Fig. 14). The circuit branches AB1, AB2 . . . ABn of the photo-resistors F1, F2 . . . F$n$ lead to the grids of amplifier tubes VR1, VR2 . . . VR$n$ indicated in Figs. 1 and 2 only with regard to their connection. Connected to the anodes of these amplifier tubes, in a manner to be detailed later, are the positions 1, 2 . . . $n$ of the calculating and comparing devices R, T by means of respective leads L1, L2 . . . L$n$ and parallel thereto the aforementioned relays AR1, AR2 . . . AR$n$, said relays being individually series connected with respective rectifiers AGL1, AGL2 . . . AGL$n$. All cathodes of the amplifier tubes VR1, VR2 . . . VR$n$ are connected to the negative bus 4 according to Fig. 2 representing a simplified wiring diagram.

Further relays R4 and R5 (Figs. 1, 17) are connected across the supply line 4, 5 in parallel relation to each other and in series with respective feeler contacts K2, K3. Feeler contact K2 is arranged between the slide contacts S$ch$1 and S$ch$2. Feeler contact K3 is arranged behind the slide contact S$ch$1. Both feeler contacts, as well as subsequent feelers K4, K5 . . . K$n$, have the same design as the above-mentioned feeler contact K1 and become effective when released by a passing record 2. An example of the design and arrangement of the feeler contacts K1, K2 . . . K$n$ is indicated in Fig. 17 for the contacts K2 and K3. According to this design, round or square sleeves 1001 are fixed, preferably by means of screws and angles, on an insulator 1000 inserted in the record carrier 1. Each of said sleeves contains a number of balls 1004, one above the other. The top ball is loaded by the arm 1005 of a spiral spring 1006 or the like fastened to the sleeve. The arm 1005 of spring 1006 is guided by slots in the wall of the sleeve 1001. The lowermost ball is normally resting on a conducting part 1007, inserted into the insulator 1000. All conducting parts associated with the respective contacts K1, K2 . . . K$n$, as well as the conducting parts associated with the contacts S$ch$1 to S$ch$3, are designed in a similar manner and, as will be described in detail, are all connected directly to the negative bus 4. The relays R4, R5 control contacts R4–1, R4–2, R4–3 and R5–1, R5–2. The indicated positions of the relay contacts (Fig. 1) are occupied when the respective relays are deenergized.

A stepping-switch magnet GZ for a record counting device and a pull magnet ZM1 with its holding contact ZM1–1 are connected parallel to each other between the relay contact R4–1 and the negative bus 4. The contacts R5–1 and R4–3 are connected with each other when relay R5 is excited. The contacts R4–2 and R5–2 are normally interconnected in a circuit which extends from the positive bus 5 (Fig. 1) to the negative bus 4 and includes the relay SRS. Another circuit through the normally closed contacts R4–2 and R5–2 includes one of the comparing devices TI, TII . . . T$n$ and extends through a rectifier G12 and a lead 8 (Figs. 4, 2), thence through the contacts R5–2 and R4–2 to the negative bus 4.

Each comparing device TI . . . T$n$ comprises a timing relay ZR–I . . . ZR$n$. The timing relay ZR–I of unit TI is shown in Fig. 4. The timing relays of the other units, all being of similar design, are similarly connected. A lead 9–I connects time relay ZR–I of comparing unit TI with a pull magnet ZM1 for operating a sorting flap K$l$1 (Figs. 1, 18). The time relays of the other comparing units TII . . . T$n$ are connected by leads 9–II . . . 9–$n$ to respective pull magnets ZM2 . . . ZM$n$ for individually operating the sorting flaps K$l$2 . . . K$l$$n$. Each sorting flap lies normally flush with the record carrier 1 as shown in Fig. 18; but when the appertaining pull magnet is energized, the flap is opened by a linking rod 1008 and then deflects the approaching record 2 into a chute.

The negative lead 9–I of the time relay ZR–I is connected to a relay DR–I and to a stepping-switch magnet BZ–I of a counter for the evaluated records (Fig. 4). The negative leads of the other time relays ZR–2 . . . ZR–$n$ are analogously connected to respective relays DR– II . . . DR–$n$ and respective counter-operating magnets BZ–II . . . BZ–$n$.

The contact feelers K4, K5 . . . K$n$ are connected in individual circuits that also include respective control magnets RZM–2, RZM–3, RZM$n$ for the pull magnets ZM2, ZM3 . . . ZM$n$ controlling the sorting flaps (Fig. 1). The contacts RZM2–1, RZM3–1 . . . RZM$n$–1 of the control magnets are connected with the holding contacts ZM2–1, ZM3–1 . . . ZM–$n$ of the corresponding pull magnets, which in turn are individually connected by the respective leads 9–2 to 9–$n$ to the electromagnets DR, ZR, BZ in one of the respective comparing devices TII, TIII . . . T$n$ in series with respective rectifiers G14, G15 . . . G1$n$ (Figs. 1, 2, 4). The anodes of the amplifiers VR1, VR2 . . . VR$n$ (Figs. 1, 2) are connected by the leads L1, L2 . . . L$n$ to contacts S2–1, S2–2 . . . S2–$n$ (Figs. 4, 19) of the respective comparing devices TI . . . T$n$, which under control by the sensing device F1 . . . F$n$ are capable of directly supplying current to the stepping-switch magnets TW1–SM . . . TW$n$–SM of testing selectors TW1 . . . TW$n$ equipped with stepping wheels 1010 (Fig. 9). Fig. 19 shows the circuit connections to the selector TWI which apply also for the selectors TW2 . . . TW$n$. The return lead of each stepping-switch magnet is connected to a lead 15 (Figs. 4, 19) leading to the contact CRI–1 of the relay LRI . . . LR$n$. The contacts S2–1 . . . S2–$n$ can be closed in any selected number for selecting definite positions to be compared. Each of the relays LRI . . . LR$n$ is connected in a circuit that extends from bus 5 through the contacts of respective relays DR–I . . . DR–$n$ and LRI–LR$n$, thence through rectifier G12, lead 8 and contacts R5–2, R4–2 to bus 4 (Figs. 4, 1). The relay LR (LRI . . . LR$n$) of each comparing device TI . . . T$n$ controls further contacts LR–2, LR–3. When the contact LR–3 is closed by excitation of the relay LR (e. g. LRI), the zero-position magnets (TW N–NM–TW$n$–NM) of the comparing selectors TW$n$ . . . TW–1 to TI . . . T$n$ at the sensing-device side of the comparing unit are supplied with current depending on which comparing device or comparing devices are in operation. The contact LR–2 is a holding contact for the respective relay LR and is connected in a circuit that includes the components 5, DR–1, LR, LR–2, R0–1, and 4. Each sensing selector TW–1 . . . TW–$n$ at the sensing-device side of each comparing device TI . . . T$n$ is associated with one selector W–1 . . . W–$n$ (Figs. 4, 20) of respective setting devices. The selectors W–1 . . . W–$n$ are also equipped with respective switching magnets and zero-position magnets (WI–SM . . . W$n$–SM, WI–NM . . . W$n$–NM). The connections of each pair of magnets to the associated selector (e. g. WI–1), beginning from the connection ranges A—A', B—B' (Fig. 19) are the same as indicated in Fig. 19 for the selector TWI–1. All switching and zero-position magnets W–1–SM . . . W–$n$–SM at each setting device TI . . . T$n$ are connected by leads 17, 18 to contacts S1'–1 . . . S1'–2, S1–1 . . . S1–$n$ (Fig. 4) which are connected with the positive bus 5 through a digit setting device in the form of a dial WS and through push-button contact DKT1 . . . DKT$n$ respectively.

A relay R0–I . . . R0–$n$ in each of the respective comparing devices TI . . . T$n$ is connected by a lead 6$b$–1 . . . 6$b$–$n$ (to 6) to the negative bus 4. The contacts assigned to the same digits or other characteristics of each selector pair TW1, W1/TW2, W2 . . . (Figs. 21, 4) are connected with each other within each comparing device TI . . . T$n$. The switching arm of one selector (e. g. W1) of a selector pair (e. g. TW1 W1) is connected to the switching arm of one selector (e. g. TW2) of the next following selector pair of the same comparing device. The switching arms of the first and last selector pair (TW1, W1/TW$n$, W$n$) of each comparing device TI . . . T$n$, that are not included by these connections, are respectively connected to a time relay ZR–I . . . ZR–$n$ and to a relay R1–I . . . R1–*n*, which in turn are connected to the supply buses 4, 5 and thus are each connected in a circuit with one selector group TW, W. The time relays ZR–I . . . ZR–*n* serve to delay the excitation and switching operation of the relays R1–I to R1–*n* in order to keep the last impulses fed to the sensing selectors TW1 . . . TW*n* off the calculating device. A rectifier G1–1 is connected between the lead 6*b*–1 . . . 6*b*–*n* of each comparing device TI . . . T*n* leading to the relay R0 and the lead connected to the zero-position magnets TW*n*. The return leads of the switching and adjusting magnets of the selectors W1 . . . W*n* of each comparing device are all connected to the negative bus 4 through respective leads 19I . . . 19*n*.

The relay R1–I or R1–II . . . or R1–*n* (Fig. 4) is switched from the contact position R1–*ab*–I and so forth to R1–*ac*–I and so forth, in dependence on the positive result of the comparison in a comparing device TI . . . T*n*. As a result, the anode voltage of the amplifier tubes VR1, VR2 . . . VR*n* is applied through the lines L1–I, 14–I . . . 14*n* to total counters RZ1, RZ2 . . . RZ*n* (Fig. 3) of the respective calculating devices. A positive result of comparison is given in the comparing device I, when the sensed impulse figure of a record is identical with the figure pre-set in the setting device W1–*n*I. The just mentioned connection extends through the circuit: 5–ZR1– coincident contacts of TW1–L and W1–*n*I, 4. When this circuit is established, the relay R1–I switches from *ab* to *ac* so that the positive bus 5 is connected through R2–3, 7 (Figs. 1, 3), *ac* (Fig. 4) in testing selector TW1–*n*, and lead 14–I (Fig. 3) to the calculating selector RZ1–*n*I. The return leads of the calculating selectors are connected to respective setting switches S3–1–*n* for determining the position figure and/or columns of the records 2; and the setting switches are connected by respective leads L1–L*n* to the anodes of the impulse amplifiers V1 . . . V*n*. Each calculating device comprises in the first, second and *n*-th position one selector RZ1, RZ2 . . . RZ*n* each. The stepping magnets of these selectors are connected to one of the lines 14–I and/or 14–II and so forth. The stepping-switch magnets of the selectors of each calculating device, operating in a manner corresponding to that shown in Figs. 19 and 20, are individually connected to the contacts S3–1 . . . S3–*n*, which are key operated for the selection of position or column of the calculating devices. The individual calculating selectors RZ1, RZ2 . . . RZ*n* are associated with relays UR1, UR2 . . . UR*n* which, for simplicity, are shown series connected in Fig. 3 but which may preferably be parallel connected depending upon voltage conditions. The circuit of relays UR1 . . . UR*n* comprises the components 5 (Fig. 1), R2–1, 6, 6*a*–I (Fig. 3), 6*a*–II or 6*a*–*n*, 4. Each relay UR1, UR2 . . . UR*n* controls a contact UR1–1, UR2–1 . . . UR*n*–1–1. Each of these contacts is series connected with a capacitor C1, C2 . . . C*n* in a circuit connecting the selector of a position of the calculating device RI, RII . . . R*n* with the switching magnet to the selector of the next higher or lesser calculating-device position. Thus, the circuit in the lesser position is always connected to the one part of the selector pertaining to said position, which completes the connection with the return lead 14I, 14II . . . 14*n* only when the selector passes from digit 9 to digit 10 (addition) or from 10 to 9 (subtraction). The drive for each calculating selector RZ1 . . . RZ*n* of each calculating device RI . . . R*n* is applicable for addition and subtraction by being coupled with a differential gearing (Fig. 22). The differential gearing is reversible in dependence upon a negative impulse. Fig. 22 shows diagrammatically such a drive of a calculating selector for addition and subtraction. The drive wheel 1013 of the differential gearing 1011 is secured to the stepping wheel 1012 of the stepping magnet of each calculating selector, e. g. the calculating selector ZR1–SM of the calculating device RI. The shaft of the planetary gears carries a detent ring 1015 engageable by the armature of an electromagnet 1016 indicating subtractive values. The driving wheel 1017 is coupled with the switching arm of the calculating selector RZ1–SM. The contact UR1–1, UR2–1 . . . UR*n*–1–1, in the case of addition, is always directly connected to the switching magnet of the selector of the next higher calculating-device position. When the calculating selector RZ1, RZ2 . . . RZ*n* passes from 9 to 10 or from 10 to 9, the capacitor C1, C2 . . . C*n* is charged. When, thereafter, the capacitor is discharged, for instance, under control by contact R2–1 (Figs. 1, 3), its discharge increases the next higher digit position (addition) by the value "1." Each individual calculating selector is equipped with a zero position magnet with a make contact S3′–1, S3′–2 . . . S3′–*n*. The circuits of all zero position magnets of a calculating device RI, RII . . . R*n* are connected parallel to each other across the buses 4, 5 in series with respective push-button switches DKR1, DKR2 . . . DKR*n*. The contacts S3′–1, S3′–2 . . . S3′*n* can be closed individually or severally for selective cancellation of individual calculating device columns or positions. The contacts S3–1, S3–2 . . . S3–*n* are conductively connected to the anode lead of the amplifier VR1, VR2 . . . VR*n*.

In contrast to the conventional direct-current amplifiers for photo-resistors and photo-cells, the photo-electric circuit is not directly connected to the control grid of an amplifier tube but is capacitively coupled by a capacitor (Fig. 11). This offers the advantage that only the voltage variation at the capacitor is utilized for control of a short impulse in the amplifier tube (utilization of the voltage increase at the capacitor). This serves to prevent overloads in the next following testing or calculating selectors in the case of prolonged exposure of a photo-cell as may be due to disturbances in the record feeding means.

In order to make the machine capable not only of totalizing the grand totals of individual records, but also of producing subtotals of individual values positioned between the identifying notations and the final value fields of a record, the machine is connected with a special device (Figs. 12, 12*a*) capable of totaling said individual values of the records. In as far as the Figs. 12, 12*a* contain the same component as the Figs. 1 to 4, the same reference symbols are used. These components also coincide essentially in their mode of operation with the components mentioned above, with the exception of the relays R5, R2 and AR1, AR2 . . . AR*n*. In addition to the contacts R5–1, R5–2 indicated in Fig. 1, the relay R5 in Fig. 12 is equipped with contacts R5–3, R5–4. Contact R5–4 is designed as double switch and may assume either of the two positions R–5–4*a* and R–5–4*b*. The contacts R2–1, AR1–1 . . . AR*n*–1 are also designed as double contacts and capable of taking the positions R2–1*a* and R2–1*b*, AR1–1*a* and AR1–1*b* . . . AR*n*–1*a* and AR*n*–1*b*. In contrast to the representation in Fig. 1, the contact R2–3 is not directly connected to the positive bus 5 but is connected to the current supply through the contact R2–2. The speed regulation device W is not directly connected to the contact SRS–1, but the connection extends through a contact S101 (Figs. 1*a*, 12) of a switch SS100. The switch SS100, comprises the individual switches S101, S102, S103, S104, S105 and may be placed in three positions, namely:

(*a*) The left position, closing the contacts S101 and S104L, and permitting only the operation of the setting and calculating devices as described in the foregoing;

(*b*) The central position (indicated in the drawing), wherein the comparing and calculating devices TI . . . T*n*/RI . . . R*n* are disconnected to permit a totalizing of intermediate values (sub-totals);

(*c*) The right position, permitting totaling of intermediate values like (*b*), but also permitting a simultaneous entering of values into the calculating devices RI . . . R*n* on response of the comparing devices TI . . . T*n*.

The left part of the single switch S102 (Fig. 12) is conductively connected with an intermediate totals relay ZMS. Relay ZMS is connected to the negative bus 4 through the contact RMS–1 of a relay RMS for preparing the intermediate totals. The relay ZMS controls a contact ZMS–1 and a small wheel 1020 (Figs. 23, 12) not further indicated. A contact segment K$t$ is connected with wheel 1020 and has a lateral lug 1021 for coaction with a contact arm T. A slide contact K may rest against one side of the contact segment K$t$. The contact T is disposed at the other side of the segment K$t$ and may temporarily engage the lug 1021.

When the relay ZMS is excited, its armature closes the contact ZMS1. This energizes the relay magnets RMS, which causes the wheel 1020 carrying the contact segment K$t$ to engage the record 2. The record carrier 1 is recessed at 1026 in the swinging range of the small wheel 1020. The wheel is supported on a lever 1022 pivoted on the machine frame and designed as the armature to the relay RMS. Wheel 1020 carries on its circumference a number of fine steel points 1023 or the like. These points are pressed against the passing record 2, 2' and so forth upon excitation of the relay. The steel points 1023 thereby securely prevent any sliding motion when taking along the record. On release of the relay ZMS, the wheel 1020 returns to its resting position biased by a spiral spring 1027. The resting position is determined by an anchoring pin 1028 of the spring abutting against the lever 1022.

The contact segment K$t$ is connected by a lead 150 (Figs. 23, 12) with the parallel-arranged contacts AR1–2 ... AR$n$–2 of the relays AR1 ... AR$n$ (Fig. 12). The lead 150 is further connected through a rectifier G1S to the contacts R2–3, R2–2 of the relay R2 and the relay RMS. The central and right part of the single switch S102 is conductively connected with the parallel-arranged contacts AR1–1$b$ ... AR$n$–1$b$. The switching magnets of the individual positions of the intermediate totalizing device RZS, essentially designed as rotary selector switches (Fig. 10), are connected to the left part of the individual switch S103 (Fig. 12). The middle and right part R of switch S103 is conductively connected with the contact RMS–2$a$. The left part L of the individual switch S104 is connected with the contact R2–3 of the relay R2. The above-mentioned lead 7 is connected to the central part of the individual switch S104. The right part R of the individual switch 104 is connected to the contact R2–1$b$, whereas the line 6 is connected to the contact R2–1$b$ of the relay R2 supplementing said contact. The individual switch 105 is connected to the lead 6' (Figs. 12, 12$a$) coming from the positive bus 5 as mentioned above and leading to the contact T of the relay ZMS and parallel thereto, via the relay URS1, URS2 ... URS$n$ to the negative bus 4. The relays URS1 ... URS$n$, like the relays US1 ... UR$n$, are also connected to the lead 6'. In this way, the current impulse passing through lead 6' is capable of releasing the tens-transfer in the intermediate totalizer RZS (Fig. 12) and also in the calculating devices RI ... R$n$ when the calculating devices RI ... R$n$ are simultaneously switched on. The lead 6 (Figs. 12$a$, 3) releases the tens-transfer only for addition of the final totals and is capable of simultaneously zeroing (clearing) the calculating, printing and punching device (Fig. 12) still to be described. The relays URS1 ... URS$n$, like relays UR1 ... UR$n$, effect the connection of the selectors of each position of the intermediate totalizer device with the switching magnets to the selectors of the next higher or next lesser calculating-device position. This connection extends through contacts URS1–1 ... URS$n$–1 (not shown) and storage capacitors, which, as to connection and operation, correspond to the contacts UR1 ... UR$n$–1 of the calculating devices RI ... R$n$ (Fig. 3).

Each position RZS1 ... RZS$n$ of the calculating device RZS is equipped with a zero setting means constructed in the form of a separate contact device according to Fig. 10. The zero setting means corresponds to the switching magnet of the same position and is disposed in the connection between the contact RMS–2$b$ and the negative bus. The zero setting means is equipped with an additional slide contact R and 10 correlated and consecutive contacts in each case. Each of said slide contacts is designed similarly to those indicated in Fig. 10 and is conductively connected through the pertaining contact arm with a contact R5–3 of the relay R5. The switching arm of each of the respective slide contacts is connected by a lead to the one positionally corresponding switching electromagnet of a calculating printing device RZD. The device RZD has also a zero setting means, i. e. a separate slide contact mechanism connected between the lead 6 and the negative bus 4 in a manner as repeatedly described in conjunction with the comparing devices TI ... T$n$ (Fig. 4) and calculating devices RI ... R$n$ (Fig. 3), RZS1 ... RZS$n$ (Fig. 12) and so forth. A printing electromagnet DM (Figs. 12, 13) associated with the calculating printing device RZD is connected in a circuit including the negative bus 4, the zero setting connection line of the intermediate totalizer device ZRS, the contact R5–4$b$ of relay R5, and a capacitor CS. Capacitor CS is connected in the normal position of the machine with the contact R5–4$a$ and thus with the positive bus 5. The calculating printing device RZD is arranged behind the sensing device F (Fig. 1) above the record carrier 1 in such a way that, upon excitation of the printing magnet DM, it is capable of performing a printing operation with the previously selected type faces of its printing wheels 151 that are coupled with the selectors of the individual positions of the calculating printing device.

The type wheel 151 of each position RZD1 ... RZD$n$ of the calculating printing device DM carries not only the type faces of the digits "0" to "9" but also a number of punches 152 (Fig. 13) according to the combination key of Fig. 7 in such a way as to operate simultaneously with the printing of the respective digits. To enable this, a rubber plate of a material similar to that of a typewriter platen roller, is inserted in the record carrier 1. If a type face of a type wheel is printed, the punches 152 (Fig. 13) near each type face simultaneously punch holes corresponding to the type face value into the record. One of the lines leading to the motor M1 (Fig. 14), e. g. the line including the speed regulation means W and the contact SRS1 of the relay SRS, may also contain series-connected contacts 201 (Fig. 12), 202 and 203 of the relays 204, 205 and 206. The relays 204, 205 are connected in the supply circuits of the amplifier tubes VR1 ... VR$n$ and so forth, and open their respective contact 201 or 202 in the event of current failure. The relay is connected in the circuit of the light source of the sensing device F and also responds to failure of current by opening its contact 203. The motor M1 is thus immediately disconnected, if one of the aforementioned main components of the machine fails to operate.

The operation of the machine described in the foregoing is as follows:

The records to be processed in the machine (Figs. 1 to 4) within a passing sequence of records may be of different size (e. g. form DIN A 4, DIN A 5 or smaller, or of a size ranging between these DIN standard forms). Depending on the size of the records of a sequence of records, the photo-resistors V1 to V3 and the sliding contacts Sch2, Sch3 in relation to the sliding contact Sch1 are particularly set in such a manner that there is always a given spacing, for instance approximately 20 mm., between the lagging edge of a record and the leading edge of the next following record in the course of cooperation of the individual drive elements. The distance of the photo-resistors V1, V2, V3 and that of the associated stops H1, H2, H3 relative to each other is approximately equal to the length of the form (for instance, 148 mm. for form DIN A 5).

The sliding contacts are then set in a corresponding manner (for instance, so that the front end of the sensing device F (Fig. 1) is spaced from the ends of the sliding contacts Sch2, Sch3 facing it by 148 mm. plus 20 mm. and 297 mm. plus 20 mm.).

The head of each record 2 (Fig. 6) indicates by punched holes a number of continuous characteristics, corresponding to the kind of record and according to the combination key indicated in Fig. 7 for digits. These punched holes, of course, under analogous application of the aforementioned key, may also be represented by characteristics or symbols expressed in the form of letters or the like, e. g. arithmetical symbols (+, —). Instead of punched holes, the characteristics may also be represented by lines or in any other way, known per se.

In the case, the record 2 is supposed to serve for the statistical compilation of workshop jobs. The code characteristics of the records are punched into the record at a given distance from the upper edge of the record. As code characteristics may be used, for instance the material-requisition slip number, the numbers of the workshop or worker doing the job, the vehicle number, the design number, the manufacturing line, and so forth. The sums and amounts belonging to these characteristics may be positioned in the same column or in another field of columns or across the columns. The values to be computed, such as wages, quantities or the like, are then entered at the lower end of the record as column totaling sums of the intermediate values or individual items.

After switching on the current for the machine, the code characteristics of the records to be evaluated are at first represented in the set-up device of the comparing device T (Fig. 4). It may be desired to pick one selected characteristic from those contained in the head of a record and then to pick the same characteristic or another characteristic from a sequence of consecutive records, and to compute the amounts or sums correlated to these characteristics arithmetically in the form of sums, products, or the like. According to a second mode of operation, however, it may also be intended to simultaneously examine several characteristics of a record, differing from the characteristics of the following records, as to their coincidence, and to then compile, in the manner aforementioned, the amounts and sums correlated to these characteristics. In both cases, each characteristic will be associated with a particular field of position in each comparing device TI . . . T$n$ corresponding to its field of position in the sensing device (F). This is obtained by connecting in each selector device, by closing the switch S2–1 . . . S2–$n$, only the one field to the sensing device that corresponds to the selected characteristic to be considered. The calculating devices associated with the individual characteristics will in these cases be split for taking up the arithmetical value corresponding to the splitting of the respective comparing devices or the particular position of the arithmetical value in the record to be computed (contacts S3–1 . . . S3–$n$). If, in contrast thereto, the amounts or sums associated with the individual characteristics are to be registered in the lowest positions (units, tens, etc.) of the selected calculating devices, then this can be effected by application of the cross-rail distributor known in telecommunication engineering. This mode of setting of sensed values can also be effected at the sensing selectors of the comparing devices, so that in this case all characteristics may be pre-set also in the lowest positions of the setting devices.

Assume, for instance, that it is intended to check groups of different characteristics of a sequence of records individually containing the characteristics 52, 788 and 526 301, and that the amounts correlated to these values are to be compiled arithmetically in the form of sums, products, or the like. The compilation may be effected selectively or simultaneously in two ways, namely either by comparison of all characteristics in only one comparing device, or by entering only one characteristic in each of two comparing devices with a corresponding value formation in but one calculating device or in separate calculating devices. The second case will be described in the following.

The setting is suitably started at the comparing device TI. For that purpose, the Kellog switch, controlling mechanically the contacts S1'–4, S2–4, is switched from its central position in such away that the contact S1–4 is opened and the contact S1'–4 closed. Then the selector dial WS is set to "5" and five single current impulses are passed consecutively to the switching magnet of the selector W4 of the comparing device TI. Then the Kellog switch of the fourth position from the right is shifted to the sensing position, and the Kellog switch of the third position is switched to the setting device in the manner aforementioned. Then the selector dial is again actuated and set to "2" so that the selector W3 of the comparing device TI assumes the setting "2." Instead of the mode of setting described, the setting may also be effected directly in each individual position by application of multi-armed manually operated rotary switches of a design known per se. Thereafter the selectors W1 . . . W$n$ of the subsequent devices, for instance the comparing devices TII and TIV, are analogously set to the characteristics "788" and "526 301" in the position fields associated with these characteristics (see Fig. 6$a$). After completed setting of the comparing devices TI . . . T$n$ from the outside, the Kellog switches of all comparing devices that have received a setting in the aforementioned position fields are switched toward the contacts S2–1 . . . S2–$n$ so that said contacts are closed.

Then the first record 2 (of the size DIN A 4 in our example) is placed onto the record carrier 1 so that the record is positioned on the feeding belts B1, B2 and rests with its longitudinal edge against the feeding rollers R. These feeding means seize the record 2 and convey it to the photo-resistors V3 to V1. At that time, each of the photo-resistors receives a light beam, whereby the photo-resistors permit ignition of the thyratrons T$h$3, T$h$2, T$h$1, which in turn supply an amplified current through their anodes to the relays R11, R9, R7 causing them to be excited. This switches the relays over to R9–1 and R7–1 causing a current to flow through the circuits 5, R10, R9–1, 4/5, R8, R7–1, 4. The relays R10, R8, being excited, switch over to R10, R8–1 and turn the stops H3, H2 out of the travelling range of the record 2. As there is not yet any record below the contact K1, there is also a current flow through the circuit 5, R6, K1, 4. The relay R6 is excited and switches over to R6–1 while simultaneously moving the stop H1 out of the travelling range of the record 2.

Now, when the record 2, being conveyed by the feeding means B1, B2 and R reaches a position below the photo-resistor V3, the record will interrupt the light beam to that photo-resistor, and the relay R11 will be released. The contact R11–2 is closed, and the relay R10 receives additionally a holding current through the circuit 5, R10, R11–2, R10–1, 4. Simultaneously, the record 2, no longer checked by the retracted stops H2, continues to travel to the photo-resistor V2 and, when reaching a position below that photo-resistor, also interrupts the light beam previously infringing upon the photo-resistor. The relay R9 is released and switches over to R9–2. Now the relay R8 receives a holding current through the circuit 5, R8, R9–2, R8–1, 4. As the relay R10 was connected to the holding-current circuit before the release of the relay R9, it remains excited by the holding current and continues holding its stops H3 outside of the travelling range of the incoming record 2.

Thereafter the record reaches a position below the photo-resistor V1, causing an interruption of the light beam to this photo-resistor. This releases the relay R7 so that contact R7–2 is closed. Since relay R8 was previously traversed by holding current, it remains unaffected by the switching-over of relay R7 from R7–1 to R7–2, With the switching over of the relay R7 to R7–2, the relay R6 is also additionally supplied with holding current in the circuit 5, R6, R7–2, R6–1, 4. The record 2 then reaches a position below the contact K1 and opens this contact so that the relay R6, like relays R8 and R10, remains excited only by holding current.

In the course of travel of the record 2 (of the size DIN A 4) to the contact K1, the lagging edge of the record 2 discontinues the interruption of the light beam to the photo-resistor V3. This reestablishes the ignition of the thyratron T$h$3. Relay R11 in the anode circuit of thyratron T$h$3 switches off from R11–2. Relay R10 is released and causes the stops H3 to return into the travelling range of the next following record 2'. The record 2', therefore, comes to rest against the stop pair H3 and is stopped from further travel. The lagging edge of record 2 now discontinues blocking the photo-resistor V2. This causes the relay R9 to switch from R9–2 to R9–1 thus releasing the relay 8. The holding stops H2 spring up into the travelling range of the following record 2'. The relay R9, switched to R9–1, causes the relay R10 to again respond in the circuit 5, R10, R9–1, 4 and thereby causes removal of the stops H3 from the travelling range of the record 2'. The record 2' then moves ahead at the spacing determined by the switching travel of the record 2 until record 2' approaches the stops H2. The light beam to photo-resistor V3 is again interrupted. Relay R11 is again released and closes R11–2, whereby the relay R10 receives holding current through the circuit 5, R10, R11–2, R10–1, 4. This initiates a repetition of the actuating and holding cycle as explained relative to the record 2. Within this period, the lagging edge of the first-inserted record 2 discontinues blocking of the photo-resistor V1. Hence relay R7 switches over to R7–1 and relay R8 receives current through the circuit 5, R8, R7–1, 4. As a result, the stops H2 are retracted and clear the travel path for the next following record 2'. The record 2' is passed without interruption by the stops H2 and reaches a position below the photo-resistor V2. This causes switching over of the relay 9 with the consequences detailed before. The lagging edge of the record 2 then also clears the contact K1, and relay R6 is again excited. The stops H1 move out of the travelling range of the record 2' and clear the further path of the record toward the interior of the machine. The up and down motion of the stops H3, H2, H1 is thus repeated in a continuous alternating cycle with the corresponding introduction of consecutive records 2, 2', 2'', etc. all automatically spaced from each other.

In the course of the further passage through the machine, the first record 2 is picked up by the feeding belt B3 which moves at a lower speed than the feeding means B1, B2, R. The record then passes below the slide contact S$ch$3 after disconnection of the contact K1. The slide contact, like the other slide contacts S$ch$2 and S$ch$1, consists of a chain of ball columns comprising a number of small balls (for instance 1.5 mm. in diameter). The chain of columns is arranged longitudinally along the feeding direction and the columns are individually arranged between the negative and positive supply leads so as to connect these leads with each other. The slide contact S$ch$3 is connected in parallel with the slide contact S$ch$2, so that the disconnection will not have any effect in the present case. The disconnection of both slide contacts S$ch$3 and S$ch$2 can become effective only after the continuing record 2 has reached a position entirely below the slide contact S$ch$2. Then the relay R3 is released (Fig. 1) and its contact R3–1 opens the circuit 5, R3–1, SRM, 4. The contacts SRM–1, SRM–2 open, and the current to the drive motor M1 for the feeding belt B3 is cut off. The stopping of the motor M1, in the initiation of the operation of the machine by the first record, is the signal for the proper actuation of the relay R2 operating as main control means.

The re-starting of the motor M1 is then effected by closing a contact A by hand. Contact A is connected parallel to the slide contact S$ch$2 in the circuit 5, R3, 4. The closing of contact A causes current to flow through the circuit 5, 3, A, 4. Relay R3 again closes its contact R3–1, and the motor M1 is again energized through the circuit 5, R3–1, SRM (SRM–1, SRM–2 closed). The record 2 is moved on by the feeding belt B3 and passes below the contact K2 thus opening that contact. This releases the relay R5, but the release does not produce any controlling action, because the contact R4–2, connected in series with contact R5–2 (relay R4 is still excited), is still open at that time.

Figure 5:
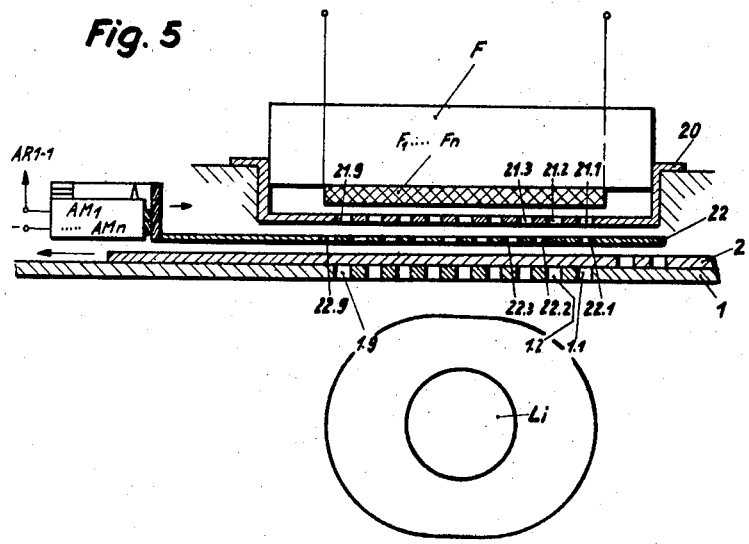
Fig. 5 is a diagrammatic representation of a member of the sensing device.

The aforementioned contact A remains closed till the record 2 passes below the slide contact S$ch$1 and interrupts that contact. Then the relay R2 is released and closes its contact R2–4. The motor M1 automatically receives continuous current in the circuit 4, R2–4, SRM, 4 by the automatic closing of the contacts SRM–1 and SRM–2. The contact A can be released by opening the manual key. When the record 2 has passed below the slide contact S$ch$1, the lagging edge of the record 2 has moved partly away from the zone of the slide contact S$ch$3 (in case of DIN A 4, or S$ch$2 in case of DIN A 5), and relay R3 is energized. The contact R3–1 is closed and supplies holding current to relay SRM. Relay R2 is released when the slide contact S$ch$1 is interrupted by the record 2 reaching a position below the contact. Relay R2 then switches over to R2–3 and prepares the sensing circuits 5 (Fig. 1), R2–3, 7, R1–I–$ab$ (Fig. 4), R1–II–$ab$ . . . R1–$n$–$ab$, LR–1, 15, switching magnets of the sensing selectors TW1, TW2 . . . TW$n$ of all comparing devices T1 to T$n$, S2–1, S2–$n$, L1 . . . L$n$, VR1 . . . VR$n$, 4. The characteristic-identifying holes in the head portion of the record 2 according to the combination key (Fig. 7) now reach a position below the sensing device F (Figs. 1, 5). The topmost hole representing each time the digit "1." The photo-resistors F1, F2 . . . F$n$ receive the respective light beams through the holes. It will now be assumed that one of the three manually set characteristics in the setting device of the comparing devices is already contained in the first record 2, for example, the characteristics "52" (Fig. 6) represented as punched holes or the like. In this case, the photo-resistors respond correspondingly and transmit current impulses. These impulses reach the amplifiers VR3, VR4 (Fig. 2), which in turn transmit in their anode circuits an amplified current impulse.

The amplified current pulses reach the comparing device T1, switches S2–3, S2–4 and so forth, and the leads L3, L4 through the circuit 5, R2–3, 7, R1–$ab$–I, LR–1–I, 15 and cause in the individually actuated sensing device members the setting of the sensing selectors TW3, TW4 to the digit value "1" by the switching magnets. Parallel thereto, the current pulses also flow through the rectifiers AGL–3, AGL–4 and the relays AR–3, AR–4 to the negative bus 4. The connection diagram (unit-type connecting diagram) of the amplifier tubes (thyratrons VR1 . . . VR$n$ indicated in Figs. 1 and 2) is actually connected with the contacts 500–1, 500–2 through respective relays in the anode circuit. On actuation of one of the amplifier tubes VR1, or VR2 . . . VR$n$, the line L1 or L2 is connected to the negative bus 4 through contact 500–1 and the actuating voltage is then applied to the relays AR1 or AR2 . . . through the contact 500–2.

The relays AR3$m$, AR4, previously not energized, now open their contacts AR3–1, AR4–1 and close the contacts AR3–2, AR4–2. These relays are held energized by the circuit 5, SRS–2, R2–2, AR3–2, AR4–2, 4. The opened contacts AR3–1, AR4–1 cause the electromagnets AM3, AM4 for the shutters of the photo-resistors F3, F4 to be released. The shutters slide to the right according to Fig. 5. This interrupts the light beam through the slots 22–1, 21–1 of both photo-resistors F3, F4; and the slots 21–2/22–2, 21–3/22–3 . . . 21–9/22–9 are brought into such a registering position that the light beams correlated to these positions are free to pass. At the moment when the change-over of the shutter 22 (Fig. 5) is effected, the second punched holes complementing the characteristics "52" are positioned below or shortly before the slots 21–2/22–2 of the third position or 21–5/22–5 of the fourth position of the record 2 from the right. As the record 2 continues moving after the sensing of its topmost row of holes, the photo-resistors F3, F4 now receive a light beam through the second and fifth row of holes of the record in the third and fourth positions through the slot rows 22–2/21–2 and 22–5/21–5 respectively. A current pulse is issued in each position by each of the two photo-resistors, and the sensing selectors TW3 and TW4 of each sensing device TI . . . Tn are advanced one further switching step. The sensing selector TW3 of the third position of each of the aforementioned sensing devices is now set to "2," corresponding to the third position of the characteristic. The punched holes in the fourth position of the fifth hole field group of the record 2 now continue advancing consecutively to the slot rows 22–4/21–4, 22–3/21–3, 22–2/21–2 and thereby cause three further impulses to be issued by the photo-resistor F4. Accordingly, the selectors TW4 of all comparing devices TI . . . Tn are advanced three further switching steps and, after the upper portion of record passes below the sensing device, will indicate, together with the selectors TW3, the setting "52," corresponding to the characteristic of the record 2.

At the moment when the sensing of the characteristic is completed and the sensing and setting selectors TW3/W3, TW4/W4 of the comparing device TI are placed into coincident positions, the current flows from the positive bus 5 through the time relay ZR–I and the adjoining pairs of coincidingly set selectors TW/W. Now the relay R–1–I is excited together with the switching magnet of the device BZ–I for counting the evaluated records. The switching magnet advances the counting device one step to the value "1." Each counting device is designed in the manner conventional for item counting devices, except that a separate electric selector is coupled with the counting device of each position respectively. The selector indicates or represents the particular counted digit of its position. In this way the indication of the counting device BZ–I . . . BZ–n can be used as a factor or divisor for subsequent calculating processes in the correspondingly designed calculating device RI . . . Rn or can directly be printed or punched. Also in parallel relation to the relay R–1–I, the current flows through the relay DR–I and through lead 9–I and rectifier GL–3 to the pull magnet ZM–1 (Fig. 1). Relay DR–I opens its contact DR–I–1; the pull magnet, now excited, opens the sorting flap Kl–1 and closes its pull-magnet contact ZM1, while relay R1–I switches its contact from ab to ac. A positive comparing process having thus been effected in the comparing device TI, the aforementioned opening of the relay contact DR–I–1 prevents the response of relay LR–I. The leads 9–I . . . 9–n connected to the pull magnets ZM–I . . . ZM–n are also connected to the actuating electromagnets of the printing or embossing devices DM–1 . . . DM–n assigned to respectively different columns of the record. The latter devices can operate to instantaneously produce a record of the result of the positively compared columns of the record (Fig. 1).

After the completed sensing operation and after the actuation of the time relay ZR–I, the record 2 advances with its leading edge below the contact K3 thus opening the contact. This releases the relay R4 (Fig. 1) which closes its contacts R4–1, R4–2 and R4–3. The holding current for the pull magnet ZM1 is thereby switched on in the circuit 5, R4–1, ZM1–1, 4. Due to the disconnection of relay R4 and the closing of its contact R4–2, the circuit 5, DR–I–1, LR–1, GL–2, 8, R5–2, R4–2, 4, is closed in all comparing devices TII, TIV (Fig. 4) supplying negative comparing results. The relay LRII, LRIV closes its contacts LR–2, LR–3 and opens the contact LR–1 for the setting of the sensing selector TW1 . . . TWn. The rectifier GL–2–II, GL–2–IV prevents current flow from 5, SRS, 8, LR–II–2/LR–IV–2 or R0–II–1/R0–IV–1 to the bus 4. The relay LRII, LRIV of the comparing devices TII, TIV simultaneously receives holding current in the circuit 5, LR–II–2/LR–IV–2, R0–II–1/R0–IV–1, 4. Current flows in the comparing devices TII, TIV through the circuit 5, DRII–1/DRIV–1 and LR–II–3/LR–IV–3 to the slide paths of the sensing selectors TW–II–n/TW–II–1 . . . TWIV–n/TW–IV–1, 4 so that the sensing selectors of the comparing devices TII, TIV are reset to zero by means of their switching magnets.

The rectifier GL1 (voltage valve) prevents simultaneously an overflow of the zero position voltage to the line 6b–II, 6b–IV. The setting of the setting selectors W1 . . . Wn of the same comparing devices is not affected by this return positioning and hence remains unchanged.

With the interruption of the contact K3 and the resulting disconnection of the relay R4 (closing of the contacts R4–1, R4–2, R4–3), the relay SRS is excited in the circuit 5, SRS, R5–2, R4–2, 4. Relay SRS switches over from SRS–2 to SRS–1 and the speed regulation means W for the motor MI is switched in and causes the motor speed to increase. The opening of the contact SRS–2 interrupts the holding current of relays AR3, AR4 (Fig. 2). Both relays are released and again connect the electromagnets AM3, AM4 to the supply line for initiation of the next sensing process.

The record 2 is now further conveyed at accelerated speed and enters with its leading edge into the sorting pocket Kl–1 (upper portion). The lagging edge of the record 2 clears the contact K2 when the end of the record approaches the sensing device F and the relay 5, now excited, opens the contact R5–2. The relay SRS is released and switches the motor MI back to normal speed. The record 2 now advances with the punched holes of its bottom portion below the sensing device F. Assuming that in the record the positive value 112 to be evaluated is represented by punched holes or the like, and that said value is punched in the same column as the characteristic "52," the holes contained in the most forward row of hole fields in the third, fourth and fifth positions of the record from the right now move below the slot group 22–1/21–1 of the shutter grids 22, 21 of the sensing device F (Fig. 5). This generates current pulses in the photo-resistors F3, F4, F5 so that these photo-resistors effect setting of the calculating selectors RZ3/RZ4/RZ5 of the third to fifth position of the calculating devices RI to the value "1." This setting is done by the respective switching magnets of the calculating selectors RZ3/RZ4/RZ5, S3–3/S3–4/S3–5, L3/L4/L5, VR3/VR4/VR5, 4 via VR3, VR4, VR5, in the manner described above through the circuits 5, R2–3, 7, R1–I–ac, 14–I. Parallel to the switching magnet, the relays AR3 . . . AR5 are also excited through the rectifiers AGL3 . . . AGL5. The electromagnets AM3 . . . AM5 are released and shift the shutters 22 in such a way that the slots 22–2 . . . 22–9 and 21–2 . . . 21–9 will register with each other respectively. A further current pulse is then caused by the holes of the third position of the second hole-field row of the record 2 due to the action of the photo-resistor F3. The pulse passes to the selector RZ3 of the calculating device RI so that this calculating device indicates the sensed value "112" in its inspection window. If the calculating device R had received the value "9" before the setting operation, a separate current impulse would have been caused by the transfer from "9" to "10" in the selector RZ3. This impulse would have caused the charging of the capacitor C3.

As soon as the lagging edge of the record 2 clears any part of the slide contact Sch1, for instance only one single contact ball, the relay R2 will respond and open its contacts R2–2, R2–3, R2–4 and close its contact R2–1. This causes a current to flow through the circuit 5, R2–1, 6, 6a–I, UR1 . . . UR$n$ (to R1 . . . R$n$), 4. The relays UR1 . . . UR$n$ of all calculating devices R1 . . . R$n$ are excited and close their contacts UR1–1 . . . UR$n$–1. The capacitor C3 of the calculating device RI, in the assumed case, can now discharge through the contact UR3–1; the switching magnet of the calculating selector RZ4 is excited, and the selector is shifted one step. The calculating device then indicates in its inspection window the value "121." The current flows, parallel to the excitation of the relay UR1 . . . UR$n$ (RI . . . R$n$), through lead 6b–I and the rectifier GL1 to the zero-switching segment of the sensing selectors TWI–$n$ . . . TWI–1 so that these sensing selectors are reset to zero by their respective switching magnets. The current passes parallel thereto, via the relay R0–I, R0–II, R0–IV (Fig. 4), to the negative bus 4; and the contacts R0–I–1, R0–II–1, R0–IV–1 of the comparing devices TI, TII, TIV are opened. The relays LRII, LRIV of the comparing devices TII, TIV that have responded to the negative comparing process are thereby disconnected.

At a much earlier moment, the next following record 2′ has again interrupted the slide contact. This occurs at the moment when the relay R2 becomes excited and the record has reached a position below the contact K2, so that its lagging edge has partly cleared the slide contact 3 (in case of DIN A 1) or the contact Sch2 (in case of DIN A 5). This operates to check the operation for proper sequence of the records, thus guaranteeing a correct operating cycle of the machine. The contact R3–1 is already re-closed by excitation of relay R3, before the relay R2, as mentioned, opens its contact R2–4. The motor M1 remains connected to the supply line. After complete clearance of the slide contact Sch1 by the record 2, the contact Sch1 applies voltage to the contact K3 at the moment when the record 2′ reaches a position below the slide contact Sch1, so that the sensing of the characteristics of record 2′ begins. All following comparing and transfer processes of the records 2′, 2″, 2$n$ take place in the same way as have been described with regard to the record 2. The temporary switching-on of the contact K3 causes, among other actions, the opening of contact R4–1 (relay R4 being excited) and thereby the disconnection of the pull magnet ZM1 from the supply bus 5. The record 2 is now filed in the sorting pocket K11 and the sorting flap K$l$1 closes.

The switching magnet for the counting device GZ (Fig. 1) is also controlled in dependence upon the opening and closing of contact R4–1 of the relay R4 and is actuated in steps by the passage of all records regardless whether the records have been evaluated or not. After filing of the record 2, the counting device GZ thus indicates in its inspection window the figure "1." The counting device is of the same design as the counting device BZ and operates in the same manner. If a positive comparing process had not taken place in the comparing device TI, but had occurred, for instance, in the comparing device TII, then the pull magnet ZM2 would have responded to actuate the sorting flap K$l$2 (Fig. 1) while simultaneously energizing the holding-current circuit 5, RZM2–1, ZM2–1, ZM2, 4. In this case, the closing of the contact K4 by the lagging edge of the record would have caused the release of the pull magnet ZM2 and thus the closing of the sorting pocket K$l$2.

If no positive comparing process is taking place in any of the comparing devices TI, TII, TIV, none of the relays RI–1, RII–1, RIV–1 (Fig. 1) will be switched over to ac, and none of the pull magnets ZM1, ZM2, ZM4 will be excited. A transfer of the arithmetical values contained in the filed record to the calculating device RI, RII, RIV is then prevented, and the record not being evaluated is passed beyond the sorting pocket K$l$n (Fig. 1) into a collecting pocket for filing. It is clear that the records contained in the collecting pocket and not yet evaluated may again be passed through the machine after re-setting of the comparing devices TI . . . T$n$ to new characteristics, so that all records can be evaluated.

The characteristics previously set up must be canceled, before any new characteristics are entered into the setting selector of the comparing devices TI . . . T$n$. For that purpose, the Kellog switches or single manual switches operated at the beginning are to be returned to initial position, all involved contacts S1 are closed, and the contacts S1′, S2 of the comparing devices TI, TII, TIV are opened. Then the canceling keys DKT1, DKT2, DKT4, or equivalent canceling slides in the case of individual manual switches, are operated, whereby, if Kellog switches are provided, the zero setting magnets of the involved setting selectors of the comparing devices TI, TII, TIV will receive canceling impulses and will return the setting selectors to "0."

Figs. 1 to 4 show only the essentials of the machine without representation of such known accessories as, for instance, conventionally included in the amplifiers, the comparing devices, etc. Therefore, an embodiment of a comparing device with Kellog switches, namely the comparing device TI for twelve testing positions $F_1$ . . . $F_{12}$, will be more fully described with reference to Figs. 8, 9 and 10. All components shown in Fig. 4 are retained and are denoted by the same respective reference characters. The contacts S1, S1′, S2 are joined with a further contact S2′ for connecting the bus 5 to the comparing device in the Kellog switches SS1, SS2 . . . SS$n$ (Fig. 9). This prevents in the positions "0" of the comparing devices, an excitation of the relay R1–I that could possibly result in a through connection. Any accidental response of the comparing and calculating devices is thus safely prevented. Each Kellog switch can be moved to three positions: a left central, and right position according to Figs. 8 and 9. A line 30 supplying pulsating current is connected to the contact DKTI whose return lead 31 is connected to the switching arms 34 (Figs. 10, 8) of three-part rotary selectors for the zero position of the sensing selectors W1 . . . W12. Each rotary selector is mechanically coupled with its sensing or setting selector (for instance W1 or TW1). The stepping-switch electromagnets of the sensing and setting selectors W1 . . . W12 and TW1 . . . TW12 are connected to contact segments 32 located in the range of the digits 1 to 9 of each selector part. The connection extends through a contact S1–1 . . . S12 or OR1/1–4, OR2/1–5, OR3/1–4. The switching magnets 1010$a$ (Fig. 25) and respective selectors are represented in Figs. 8 and 7 as squares denoted by W1, TW1 etc. Fig. 25 shows a selector W1 . . . W12 or TW1 . . . TW12 as actually designed and driven. The indicated groups of lines W1–W, TW1–W etc. (Figs. 8, 9) between each square pair, such as the pair W1/TW1, correspond to the identically designated contacts of the associated selector pairs.

The lead 6b–1 (Figs. 4, 8, 9) is connected to parallel-arranged relays OR1, OR2, OR3 of which each is correlated to four pairs of selectors, such as the four pairs W1/TW1 . . . W4/TW4. Each of relays OR1, OR2, OR3, when energized, closes four contacts OR1–1, OR1–2, OR1–3, OR1–4, OR2–1 etc. (Figs. 9, 8). One contact of each relay is connected to a stepping-switch electromagnet of a sensing selector TW1, TW2 . . . TW12. All switching arms 34 of the sensing-selector group TW1, TW2 . . . TW12 are connected to a second line 30$a$ carrying pulsating current, for instance of 16⅔ cycles per minute. The contact segments 32 and switching arms 34 of each setting and sensing selector are bridged by a capacitor, such as the capacitors C1 to C12 of selectors TW1 . . . TW12, for spark quenching. An overload fuse W1$r$, W2$r$ . . . W12$r$ is connected in the return lead of each switching magnet.

The selectors of each pair have their corresponding bank contacts (W1–W, TW1–W etc.) connected in series with each other and in series with the two corresponding bank contacts of the other selector pairs; and a common lead connects these bank contacts with the time relay ZR (Fig. 8). The time relay is bridged by a capacitor C14 and is connected through a rheostat ZRP, a lead 5a and the contacts S2' to the positive bus 5. The rheostat ZRP is adjustable for setting the charging time of the capacitor C14. The capacitor C14, when attaining a given charging potential, causes the relay ZR to respond. The relay ZR controls a contact ZR-1 series connected with a relay ZRS between the aforementioned common lead of the selector pairs W1/TW1 ... W12/TW12. The relay ZRS when excited, closes the contacts ZRS-1, ZRS-2. These contacts connect the positive bus 5 with the relays and electromagnets R1-I, BZ, DR, ZM1 etc. As shown in Fig. 8, the relay R1-I (Fig. 4) is actually composed of a group of four relays R1A, R1B, R1C, R1D, each equipped with three contacts. The operation of the apparatus according to Figs. 8, 9 is analogously the same as that explained with regard to Fig. 4 and Figs. 1 to 3. It is to be noted, however, that the current flow is in the reverse direction as compared with Fig. 4; that is, the negative and positive buses are interchanged.

The sums, products or other results formed in the calculating devices RI ... Rn or RZS, as well as the associated settings of the comparing devices TI ... Tn, may be transferred optically or electrically to recording or printing devices RZD (Fig. 23). Such a transfer is initiated, for instance, by depressing a manual key 1200 (Fig. 26) whose make contact 1201 is connected in a section of the line 30a and when closed, applies excitation to the switching magnet 1300 by pulsating current.

The clearing of the calculating devices, after obtaining the sums, products or other results, is effected by actuating the canceling keys DKRI ... DKRn in an analogous manner as described with reference to the setting selectors W1 ... Wn of the comparing devices TI ... Tn.

In the foregoing, a comparing, evaluating and calculating process has been demonstrated merely as regards the characteristic "52" punched in the third and fourth positional fields of the record 2. It is clear that when the same record 2 also contains the characteristics "788" and "526 301," these characteristics will simultaneously cause a transmission of current impulses while the characteristic "52" is being sensed. The current impulses reach the testing (sensing) selectors of the comparing devices TII, TIV which at that time are correspondingly connected as described above. The testing selectors are then actuated and set. When the setting of the sensing and setting selectors of the latter comparing devices are coincident, the calculating devices RII, RIV are also connected. All further processes are then analogously the same as explained relative to the characteristic "52." If the characteristic "52" is not punched in the record 2, but, for instance, the characteristic "788" is punched alone, then the properly associated calculating device will be called upon to take over the value, provided there is a positive comparing process. The same operating cycle occurs, displaced as to time, when the characteristic "788" is contained in the next following record 2'.

The operation for the addition of the intermediate values of a record 2, 2', 2'' in the calculating device RZS, with switch SS100 (Fig. 12) in the central position, is as follows:

After completed sensing of the characteristics, which in this case has no further influence upon the comparing devices TI ... Tn and upon the addition of the intermediate values, the relay SRS1 prepares the speed control means W of the motor MII for operation as described above. The speed control, however, cannot become effective as the section switch S101, now open, interrupts the connection SRS-1, W. Hence the record is fed on at normal speed and enters below the sensing device F (F1 ... Fn). The relay RMS, excited in the circuit 5, SRS-2, R2-2, RMS, 4, becomes de-energized by the simultaneous or immediately following opening of SRS2. The contacts RMS-1, RMS-2 assume neutral positions (as shown). The connection of ZMS is prepared by the contact RMS-1, and voltage is applied by RMS-1 and 5, S103 to the calculating device RZS. The calculating device RZS is capable of performing the same functions as the calculating devices RI ... Rn described above. When an impulse of an intermediate value is taken up by the sensing device F1 ... Fn, the corresponding relay AR-1 ... AR-n will respond, as well as the corresponding position of the calculating device RZS, through the rectifier AGL1 ... AGL-n. Contact AR1-1a switches over, and the current can now flow from bus 5 through AR1-1b, S102 to ZMS, RMS-1 to the negative bus. Simultaneously, the pre-excited relay AR1 receives holding voltage in the circuit 5, ZMS-1, ZMS-K, AR1-2, 4. The relay AR remains picked up as described above. Upon excitation of the relay ZMS, the contact ZMS-K, as explained above, interrupts the voltage during the rolling-off of the small wheel Kt in accordance with the line spacing of the record and causes a successive release of the AR-relays. This prepares the photo-sensing for the scanning of the numerical values of the next row. Shortly before the slide contact path K1 has reached the end position relative to the switch arm ZMS-K, the contact T is closed. This initiates the tens-transfer through the relays URS1, URS2 ... URSn (storage capacitors not shown) as described analogously with regard to the calculating devices RI ... Rn. The holding voltage for the relay AR1 ... ARn is cut off after the slide contact K1 passes completely beyond the switch arm K. Relay AR1b again switches to AR1a; relay ZMS is de-energized, and the contacts ZMS-1 and ZMS-K return to the starting position due to the resetting of the wheel 1020 with the slide contact Kt. This cycle is repeated with each new subtotal or intermediate value till the field assigned to the final total approaches the sensing device F (F1 ... Fn) and the rear edge of the record clears the contact K2 (Fig. 1) and controls the relay R5 to switch over. This causes the relay SRS to drop out as described in an earlier place. Current passes from bus 5 through SRS2, R2-2 and RMS to bus 4. RMS-1 opens and prevents any further response of ZMS. RMS-2a simultaneously switches over to RMS-2b and causes a current to flow to the zero operating means of all positions RZS-1 ... RZS-n of the calculating device RZS. During the zeroing run, four current pulses are issued to the respective counting devices RZS1, RZD2 ... RZDn by the contact arms of the slide contacts R in the circuit 5, R5-3, R, switching electromagnets RZD1 ... (here alone, because the value of only one digit was taken up through AR1). These pulses set the value-printing and punching device RZD. The zeroing run in the calculating device RZS is always in the same direction of rotation as the preceding adjusting run.

The value-printing and punching device RZD is accordingly designed as plain reciprocal device; that is, only the reciprocal position values of the intermediate totalizing device are being set. The printing wheels of each position of the printing and punching device, however, do not indicate the reciprocal values, but the values in their true order. The capacitor CS, charged in the circuit 5, R5-4a, 4, can discharge only after completed zero setting of RZS. The discharge passes through R5-4b, zero connecting line ZRS0-0 (similar to the through connection of the setting devices TI ... Tn, but having only one zero position), DM, and 4. The capacitive discharge pulse applies excitation to the printing or punching magnets DM through operation of a relay 1202 (Fig. 24), which, according to the complete connection diagram, is disposed in the through-connection to the calculating device RZS1 ... RZSn (Fig. 12). This through-connection extends from the contact R5-4b to the negative bus 4. The relay 1200 controls a contact 1200–1 which is series connected with the printing magnet DM (Figs. 10, 12a) between the positive and negative buses 5, 4 and supplies current to the printing magnet when closed. The respective totalized results of a record are thus printed upon, or punched into, the record (totals field at the bottom end) by the printing and punching device RZD. As explained above, the contact R2–1 becomes closed when the lagging edge of the record clears the slide contact group Sch1. In this case, the control line 6, which also effects the zeroing operation of the comparing device members TI . . . Tn at the sensing side, also conveys the signal for the zero setting of the printing and punching device.

In the right position of the switch SS100, the operating cycle takes place in the same manner as in the central position with the only difference that, through S104–R, all setting devices TI . . . Tn and all calculating devices RI . . . Rn can be driven additionally in the manner described above (Figs. 3, 4). The UR relays of the calculating devices RI . . . Rn are excited for tens-transfer through the contact S105 (Figs. 12, 12a). For that purpose, the line 6' branching off from the feeding line to the relays URS-1, URS-2 . . . URSn through the switch S105 is connected through a rectifier GLV (Fig. 12a) with the line 6 which leads via 6a–1 . . . 6a–n to the calculating devices RI . . . Rn. This makes it possible that simultaneously with the totalizing of intermediate values or subtotals of the records, also such values that belong to particular characteristics can be entered by the comparing devices TI . . . Tn into the calculating devices RI . . . Rn during one and the same processing run of the records.

It will be obvious to those skilled in the art, upon a study of this disclosure, that our invention permits of various modifications, particularly with respect to the design and interconnection of the machine components, without departing from the essence of the invention and within the scope of the claims annexed hereto.

We claim:

1. Apparatus for the evaluation of data recorded on records as pertaining to different group characteristics, comprising a conveying device for receiving the records in an unsorted sequence, spacing means disposed at the entrance side of said conveying device and controllable by the passage of each record to release the next-following record for further conveying travel so as to establish a given spacing between the consecutive records during said further travel, a sensing device disposed at a sensing location along said further travel and responsive to said records to pick up the data pertaining to selected ones of said characteristics, a number of comparing devices pre-settable to respectively different characteristics and selectively connectable with said sensing device to be operated in accordance with the picked-up data, a group of totalizing units selectively connectable to said comparing devices for receiving any positive results of the comparing operation whereby said calculating units totalize said data for respectively different characteristics of a sequence of said records, a number of controllable lay-off means serially disposed along said conveying device and behind said sensing device for discriminately collecting the records at the end of said further travel, control means connecting said lay-off means with said comparing devices for selectively controlling said lay-off means in dependence upon said comparing operation, clearing means for zeroing said comparing devices, and control means responsive to the passage of each record beyond said sensing device and connected with said clearing means for resetting said comparing devices.

2. In apparatus according to claim 1, said conveying device comprising two successively arranged and separately driven conveyor units, a first one of said conveyor units being located along said spacing means and being loosely engageable with said record, said spacing means being capable of stopping said records relative to said first conveyor unit, and said other conveyor unit extending from said first conveyor unit beyond said sensing device and being positively engageable with said records for constrainedly conveying said records.

3. In apparatus according to claim 2, said spacing means comprising a number of stops for retaining said records on said first conveyor unit, and a number of sensing members spaced from each other along said first conveyor unit and responsive to the passage of said individual records, means connecting said sensing members with said stops for releasing said stops in response to operation of said respective sensing members, said control means being interlocked so that one of said sensing members located ahead in the conveying direction permits operation of a subsequent one of said sensing members only when said one sensing member is cleared by a record, whereby said spacing means secure a desired spacing regardless of differences in the size of the records.

4. In apparatus according to claim 3, said sensing members of said spacing means consisting of photoelectric devices and having respective beams of light intercepted by a record entering into the location of each photoelectric device.

5. In apparatus according to claim 1, said sensing device comprising a group of individual sensing members distributed across the width of the records transverse to the travel direction of said conveying means so as to respond to the characteristics as well as to all individual other data recorded on the records.

6. Apparatus according to claim 5, comprising a number of group switches each interposed between said sensing device and one of the respective digit positions of each of said comparing devices, said switches having selective positions in which said comparing devices are prepared for comparing operation and for zero-setting respectively, whereby the computing devices simultaneously connected with said sensing device through said switches are capable of selecting from a sequence of the records those individual records that have an equal number of different pre-selected characteristics.

7. In apparatus according to claim 6, each of said comparing devices comprising pairs of pre-setting units and signal-responsive units, each of said two units of each pair having a bank of contacts and a movable selector contact engaging said bank, said contacts of each bank being connected with the respective contacts of the other bank, said selector contact of said pre-setting unit being pre-settable to a selected bank contact, and said signal-responsive unit having a stepping magnet electrically connected with said sensing device for moving said selector contact of said latter unit to said selected bank contact when the signal received from said sensing device has a proper number of pulses.

8. In apparatus according to claim 7, said pre-setting units of all said pairs having respective stepping magnets connected with said selector contacts of said pre-setting units, and a pulse circuit selectively connectable with said stepping magnets of said pre-setting units and comprising a dial switch for actuating each selected pre-setting unit.

9. Apparatus according to claim 7, comprising relay means connected between said respective comparing devices and said calculating units and responsive to occurrence of a positive result of comparison in said respective comparing devices to accordingly select a particular one of said calculating units, whereby said selection of said one calculating unit is effected in dependence upon the compared characteristics of a record prior to entering into said one selected calculating unit the data to be taken from said record.

10. Apparatus according to claim 7, comprising zeroing means connected with said signal-responsive units of said comparing devices for returning said signal-responsive units to zero position, said zeroing means being connected with said pickup means immediately behind said sensing device to return said signal-responsive units to zero immediately after the sensing of the characteristics of a record when the result of comparison in said comparing devices is negative.

11. Apparatus according to claim 7, wherein, in the event of a positive result of comparison in said comparing devices, said signal-responsive units are cleared back to zero, in parallel relation to the preparation of the tens-transfer means of said calculating units, and in dependence upon relay means responsive to the release of said one contact group by the travelling record immediately after the sensing of the data to be computed.

12. In apparatus according to claim 9, each of said comparing devices comprising time delay means connected with said relay means and also responsive to said positive result of comparison, and each of said comparing devices having an item counter connected with said time delay means to be controlled thereby for counting the number of evaluated records, a control relay for controlling the interconnection of said comparing device and said sensing device, said control relay being connected with said time delay means to be controlled thereby, and circuit means connecting said time delay means with said lay-off means for selecting one of said respective lay-off means.

13. Apparatus according to claim 11, comprising electronic means for controlling the tens-transfer in said calculating units, pickup means responsive to the record passing completely beyond the range of said sensing device and connected with said electronic means for effecting the tens-transfer after completion of the sensing operation.

14. Apparatus according to claim 1, comprising a plurality of contact groups disposed along said conveying device and engageable with the records being conveyed, each of said groups having a number of individual contacts serially aligned in the record travel direction, one of said groups being disposed at the location of said sensing device, the other groups being disposed in said direction ahead of said sensing device for controlling said comparing devices and determining the operating period of said sensing device and controlling the switching operations of said totalizing units.

15. In apparatus according to claim 14, said one contact group at the location of said sensing device being shorter in the record travel direction than said preceding contact groups in order to compensate for any discrepancies in mutual spacing of the records.

16. Apparatus according to claim 14, comprising a manual start-control member for starting the operation relative to the first record of a sequence, said member being connected parallel to one of said other groups of contacts to simulate, when actuated, the passage of a record by said latter groups of contacts.

17. In apparatus according to claim 14, each of said contact groups comprising a number of columns serially aligned along the conveying direction of said conveying device, each of said columns comprising a number of conductive balls arranged one above the other and biased toward the travel path of the records, a stationary contact disposed in said path and normally in contact engagement with the adjacent one of said balls so that said contact engagement is broken when a record passes between said contact and said latter ball.

18. In apparatus according to claim 1, said sensing device comprising a group of individual photoelectric pickups distributed across the width of the records across the travel direction of said conveying means, and pulse amplifiers connected with said respective pickups for controlling respectively said comparing devices and said calculating units depending upon the stage of operation.

19. Apparatus according to claim 18, comprising control relay means connected with said respective pickups, switching members connected with said respective control relay means and operable by said control relay means to assume a given switching position in response to the first pulse issuing from said respective pickups and to maintain said position until after the characteristics-denoting notations of a record pass beyond the sensing range of said sensing device.

20. In apparatus according to claim 18, said pulse amplifiers comprising an amplifier tube having a control grid, and said photoelectric pickups being capacitively coupled with said respective control grids, whereby overloads in said comparing devices and said calculating units due to excessively long response of said pickups are prevented.

21. Apparatus according to claim 19, comprising a pickup means arranged in the conveying direction behind said sensing device and said one contact group, said pickup means being responsive to arrival of a record sensed according to its characteristics, speed-control means for temporarily accelerating the travel of said conveying device, and a speed-control relay responsively connected to said pickup means and connected with said speed-control means for actuating said speed-control means to rapidly advance said record in order to place its foot portion at a position of representation of totalized values and to prevent the sensing of any remaining data of the record by return-switching of said control-relay means.

22. Apparatus according to claim 21, comprising a counter connected with said speed-control relay to be operated one count by each response of said pickup means, whereby said counter counts all records regardless of the result of the comparing operation.

23. Apparatus according to claim 21, comprising another record-responsive pickup means disposed immediately ahead of said sensing device and controllingly connected with said speed-control means for causing it to shift back to normal conveying speed when said other pickup means is not affected by a passing record, and circuit means also controlled by said other pickup means for simultaneously re-connecting the sensing device for subsequent totalization of the recorded data.

24. Apparatus according to claim 21, comprising a selector switch for setting the apparatus to totalizing and sub-totalizing operations respectively, said selector switch being connected with said speed-control means for obviating its speed-increasing operation when said selector switch is in sub-totalizing position.

25. In apparatus according to claim 22, said layoff means comprising a number of normally closed sorting flaps serially aligned in the conveying direction behind said pickup means, the first one of said sorting flaps having a control means connected with said speed-control relay for controlling the opening period of said first flap in response to said pickup means.

26. In apparatus according to claim 24, said control relay means having respective self-holding contacts; a control device parallel connected to said self-holding contacts and controlled by the series-connected components that also control the speed-control means and the sensing device and the calculating units; a sub-totalizer mechanism having tens-transfer means; a sub-total printer; and an intermediate control means controlled by said control device and connected with said sub-totalizer mechanism and printer for preparing said mechanism for possible tens-transfer and releasing said mechanism for clearance while simultaneously transferring the sub-total to said printer when the totals-receiving foot portion of the record approaches said sensing device.

27. Apparatus according to claim 25, comprising further record-responsive pickup means arranged immediately ahead of the respective other sorting flaps, flap-opening control means for temporarily holding said respective other sorting flaps in open position, said flap-opening control means being connected with said respective further pickup means to be controlled thereby.

28. Apparatus according to claim 26, wherein said intermediate control means is connected with said control relay means to be controlled thereby so as to respond to the sensing of single-item data (located between the characteristics portion and the totals portion of a record) so that each data-containing line of a record will initiate a new interval of response of those components that secure the sensing of each single item and its transfer to the sub-totalizer mechanism and will cause the tens-transfer in said mechanism prior to disconnecting said components.

29. In apparatus according to claim 28, said sub-totalizer mechanism having a single direction of operation so as to be reset to zero in the same direction in which said mechanism is set to a sub-total, means connecting said sub-totalizer mechanism with said printer during resetting of said mechanism whereby the reciprocal value of said sub-total is transferred to said printer, said printer having indicia arranged in reciprocal order so as to be set to the actual sub-total value when said resetting of said mechanism is completed.

30. Apparatus according to claim 1, comprising an item counter in each of said comparing devices, said item counter being responsive to the number of records passing through said conveying device and having a plurality of digit wheels, and respective selector switches connected with said digit wheels to be adjusted in accordance with the counted number, and means connected with said selector switches to operate in dependence upon said counted number.

31. Apparatus according to claim 1, comprising a cross-rail selector interposed between said sensing device on the one hand and said comparing devices and totalizing units on the other hand, whereby the data picked up from different columns of one and the same record are always entered into the lowermost digit positions of said comparing devices and units respectively.

32. Apparatus according to claim 1, comprising a sub-totalizer mechanism selectively connectable with said sensing device for providing a sub-total of single-item data picked up from a record in said sensing device, a printer arranged near the travel path of said conveying device behind said sensing device and engageable with said record for entering said sub-total, a record-responsive pickup disposed immediately ahead of said sensing device so as to be in responsive condition for a period during which the single-item field of said record is passing through the range of said sensing device, relay means connected with said pickup and controlled thereby to maintain a given control condition during said period, an energy storing means connected with said relay means, said relay means completing a charging circuit of said storing means during said period whereby said storing means discharges upon termination of said period, and circuit means connecting said storing means with said printer for causing the discharge of said storing means to cause operation of said printer under control by said relay means.

33. Apparatus according to claim 32, comprising switch contact means responsive to said record and located along said range of said sensing device so as to perform a switching operation at the moment when said record leaves said range, said printer having zeroing means connected with said switch contact means for clearing said printer under control by said switching operation, and said comparing devices having zeroing means also connected with said switch contact means so as to be cleared back to zero when previously indicating a positive result of comparison.

34. Apparatus for the evaluation of data recorded on records as pertaining to different group characteristics, comprising a conveying device for receiving the records in an unsorted sequence, spacing means disposed at the entrance side of said conveying device and controllable by the passage of each record to release the next-following record for further conveying travel so as to establish a given spacing between the consecutive records during said further travel, a sensing device disposed at a sensing location along said further travel and responsive to said records to pick up the data pertaining to selected ones of said characteristics, a calculating means connected with said sensing device and responsive to the picked-up data for computing a total from the data pertaining to each selected characteristic of the individual records, recording means connected to said calculating means and disposed along said conveying device and engageable with said records for recording said computed total on each record in correlation to the corresponding one of said characteristics, a number of comparing devices pre-settable to different characteristics and selectively connectable with said sensing device to be operated in accordance with the picked-up data, a number of controllable lay-off means serially disposed along said conveying device and behind said sensing device for discriminately collecting the records at the end of said further travel, control means connecting said lay-off means with said comparing devices for selectively controlling said lay-off means in dependence upon said comparing operation, clearing means for zeroing said comparing devices, and control means responsive to the passage of each record beyond said sensing device and connected with said clearing means for resetting said comparing devices.

35. In apparatus according to claim 34, said recording means comprising a printing or punching device for entering a notation on the record in a given spacial relation to the respective columns of recorded data being evaluated, said comparing devices having respective control means responsive to occurrence of a positive result of comparison, and circuit means connecting said notation-entering devices with said respective control means for controlling said latter devices to operate in dependence upon said occurrence.

36. Apparatus for the evaluation of data recorded on records as pertaining to different group characteristics, comprising a conveying device for receiving the records in an unsorted sequence, spacing means disposed at the entrance side of said conveying device and controllable by the passage of each record to release the next-following record for further conveying travel so as to establish a given spacing between the consecutive records during said further travel, a sensing device disposed at a sensing location along said further travel and responsive to said records to pick up the data pertaining to selected ones of said characteristics, a calculating means connected with said sensing device and responsive to the picked-up data for computing a total from the data pertaining to each selected characteristic of the individual records, recording means connected to said calculating means and disposed along said conveying device and engageable with said records for recording said computed total on each record in correlation to the corresponding one of said characteristics, a number of comparing devices pre-settable to different characteristics and selectively connectable with said sensing device to be operated in accordance with the picked-up data, a group of totalizing units selectively connectable to said comparing devices for receiving any positive results of the comparing operation whereby said calculating units totalize said data for respectively different characteristics of a sequence of said records, a number of controllable lay-off means serially disposed along said conveying device and behind said sensing device for discriminately collecting the records at the end of said further travel, control means connecting said lay-off means with said comparing devices for selectively controlling said lay-off means in dependence upon said comparing operation, clearing means for zeroing said comparing devices, and control means responsive to the passage of each record beyond said sensing device and connected with said clearing means for resetting said comparing devices.

No references cited.